United States Patent [19]
Ninomiya et al.

[11] Patent Number: 5,751,375
[45] Date of Patent: *May 12, 1998

[54] PROCESSING OF PIXEL DATA AT AN OPERATING FREQUENCY HIGHER THAN THE SAMPLING RATE OF THE INPUT SIGNAL

[75] Inventors: Kazuki Ninomiya; Tamotsu Nishiyama; Jiro Miyake, all of Osaka, Japan; Katsuya Hasegawa, Palo Alto, Calif.

[73] Assignee: Matsushita Electric Industrial Co., Ltd., Osaka, Japan

[*] Notice: The term of this patent shall not extend beyond the expiration date of Pat. No. 5,555,197.

[21] Appl. No.: 798,824

[22] Filed: Feb. 12, 1997

Related U.S. Application Data

[60] Continuation of Ser. No. 618,610, Mar. 20, 1996, which is a division of Ser. No. 226,663, Apr. 11, 1994, Pat. No. 5,555,197.

[30] Foreign Application Priority Data

| Apr. 12, 1993 | [JP] | Japan | 5-084712 |
| Jul. 26, 1993 | [JP] | Japan | 5-183836 |
| Aug. 3, 1993 | [JP] | Japan | 5-192195 |

[51] Int. Cl.$^6$ .............................. H04N 5/14; H04N 9/64
[52] U.S. Cl. ................ 348/571; 348/715; 348/721; 348/718; 348/719; 348/555
[58] Field of Search ................. 348/571, 611, 348/613, 614, 555, 714, 715, 718, 719, 720, 721; H04N 5/14, 9/64, 5/46

[56] References Cited

U.S. PATENT DOCUMENTS

| 4,718,057 | 1/1988 | Venkitakrishnan et al. | 370/55 |
| 4,745,463 | 5/1988 | Lu | 358/23 |
| 4,979,040 | 12/1990 | Masumoto |  |
| 5,027,423 | 6/1991 | Kawata et al. |  |

(List continued on next page.)

FOREIGN PATENT DOCUMENTS

| 0 253 476 | 1/1988 | European Pat. Off. |
| 0 268 408 | 5/1988 | European Pat. Off. |
| 0 321 568 | 6/1989 | European Pat. Off. |
| 0 327 445 | 8/1989 | European Pat. Off. |
| 0 371 677 | 6/1990 | European Pat. Off. |
| 0 375 959 | 7/1990 | European Pat. Off. |
| 0 378 253 | 7/1990 | European Pat. Off. |

(List continued on next page.)

OTHER PUBLICATIONS

Seiichiro Iwase et al., "A New Multiplier–Added LSI for Digital Video Processing," SMPTE Journal, pp. 830–835, Sep. 1984.

U. Schmidt et al., IEEE Transactions on Consumer Electronics, vol. 36, No. 3, pp. 327–333 (1990).

A.H.M. van Roemund et al., IEEE Transactions on Consumer Electronics, vol. 35, No. 3, pp. 249–258 (1989).

S. Gohshi et al., "Consideration about a Chrominance Signal Processing for MUSE System," ITEJ Technical Report, vol. 16, No. 32, pp. 13–18, ICS '92–40 (Jun. 1992).

(List continued on next page.)

*Primary Examiner*—Sherrie Hsia
*Attorney, Agent, or Firm*—McDermott, Will & Emery

[57] ABSTRACT

A coprocessor is incorporated in a processor comprising a CPU, an instruction cache, a data memory, a bus controller, an interruption control section and a DMA controller. This coprocessor has a parallel sum-of-products arithmetic operation section, a comparator, an I/O register section, and a sum-of-products factor register section. A frame memory, provided on the input side, stores MUSE or NTSC signals digitized per pixel. The DMA is in control of the transfer of data between the input-side frame memory and the data memory as well as the transfer of data between a frame memory provided on the output side and the data memory. Pixel data stored in the data memory is processed according to broadcasting systems by the switching of sum-of-products factors on the basis of software.

17 Claims, 29 Drawing Sheets

U.S. PATENT DOCUMENTS 5,093,722  3/1992  Miyaguchi et al. .................... 358/140
5,627,603  5/1997  Sakai ...................................... 348/719

FOREIGN PATENT DOCUMENTS 0 397 180  11/1990  European Pat. Off. .
0 444 368   9/1991  European Pat. Off. .
0 449 075  10/1991  European Pat. Off. .
0 522 697   1/1993  European Pat. Off. .
0 524 009   1/1993  European Pat. Off. .
0 529 442   3/1993  European Pat. Off. .

OTHER PUBLICATIONS

T. Satoh et al., "Scan Line Conversation LSI for Wide Screen TV Receiver," ITEJ Technical Report, vol. 16, No. 71, pp. 19–24, BCS '92–41 (Oct., 1992).

Yoshio Seki et al., "Video Signal Processing for HDTV Receiver," IEEE Transactions on Consumer Electronics, vol. 35, No. 3, pp. 198–205 Aug. 1990.

SCANNING DIRECTION

Y SEPARATION $\sum_{i=1}^{15} a_i \cdot p_i$

906 IMAGE WITH MOVEMENT ?

FIG. 20

|  | 0 | LOW-ORDER ADDRESS | 3ff |
|---|---|---|---|
| 0 | $a_0$ | $a_1$ | $a_{3ff}$ |
| | $b_0$ | $b_1$ | $b_{3ff}$ |
| | $c_0$ | $c_1$ | $c_{3ff}$ |
| 3 | $d_0$ | $d_1$ | $d_{3ff}$ |

HIGH-ORDER ADDRESS

F I G. 27
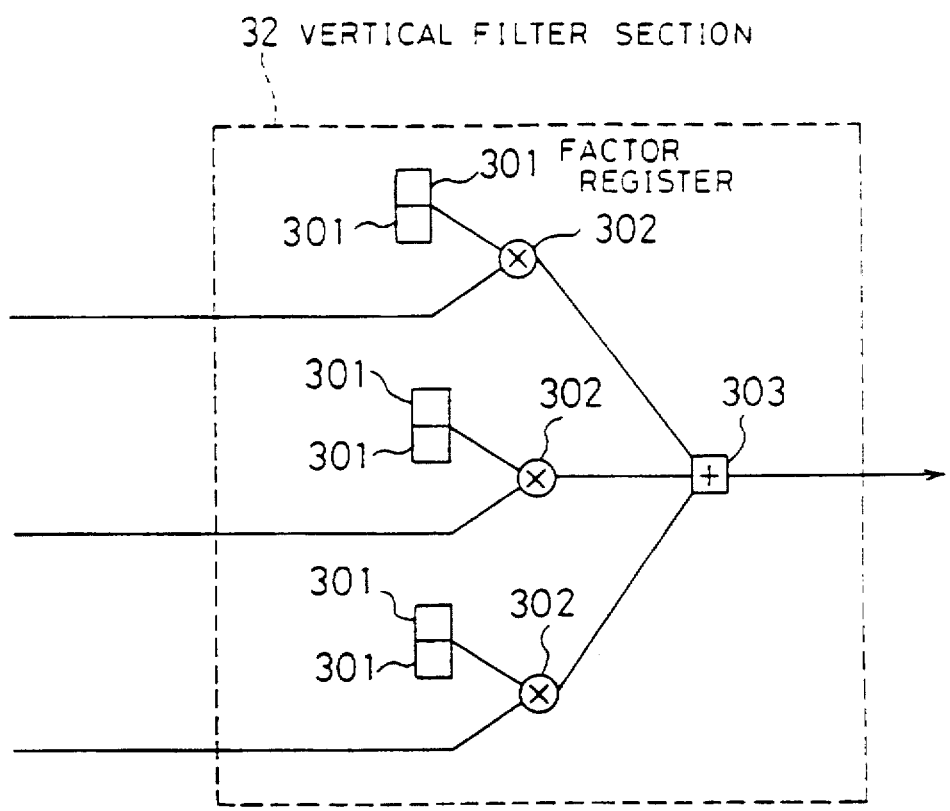

PROCESSING OF PIXEL DATA AT AN OPERATING FREQUENCY HIGHER THAN THE SAMPLING RATE OF THE INPUT SIGNAL

This is a continuing application of Ser. No. 08/618,610, filed on Mar. 20, 1996, now allowed which is a divisional application of Ser. No. 08/226,663, filed Apr. 11, 1994, now U.S. Pat. No. 5,555,197, issued Sep. 10, 1996.

TECHNICAL FIELD OF THE INVENTION

This invention relates to a video signal processor capable of performing a process-switch function by software and to its video signal processing technique.

BACKGROUND OF THE INVENTION

There have been demands for a television system capable of providing a high resolution. To meet such demands, a television system called the EDTV (Extended Definition Television) system was introduced and has been put to practical use. The MUSE (Multiple Sub-nyquist Sampling Encoding) system, which is one of the HDTV (High-definition Television) systems, has been proposed, and some of the MUSE systems have been put to practical use. It is expected that advanced television systems such as an EDTV II system (i.e., the second-generation EDTV) and a digital television system will come in practice in the near future. In view of these developments in the field of TV broadcasting system, video signal processors including television receivers and video tape recorders must be designed such a way that they can receive broadcasting signals of different television systems including the existing NTSC (National Television System Committee) system. A conventional TV receiver has plural different boards each of which corresponds to a respective television system. These boards are exchanged depending on the received signal. This technique is introduced as a background technique of "Scan Line Conversion LSI for Wide Screen TV Receiver", ITEJ Technical Report, vol.16, No.71, pp.19–24, BCS'92–41 (Oct., 1992) by Toshichika Satoh et al.

How conventional TV receivers having a MUSE signal processing board and a NTSC signal processing board operate is described. According to the MUSE system standard, the sampling rate=16.2 MHz; the number of pixels (per scanning line)=480; and the number of scanning lines=1125. On the other hand, according to the NTSC system standard, the sampling rate=14.3 MHz; the number of pixels (per scanning line)=910; and the number of scanning lines=525.

First, the MUSE signal is considered. The MUSE signal processing board separates a received MUSE signal into a Y signal, an R-Y signal, and a B-Y signal. In the MUSE system, in order to make high vision signals fall within the specified transmission bandwidth range, pixel data is band-compressed by making use of the fact that pixels of a previous field coincide with pixels of a current field in the case of an image without movement and the fact that the human eye has poor resolving power to an image with movement. Therefore, the MUSE processing board performs different processes depending upon the image type. An image without movement is processed according to a procedure that mainly consists of two processes; namely interpolation between specified frames (inter-frame interpolation) and interpolation between specified fields (inter-field interpolation). For the case of images without movement, each one-picture (frame) data is transmitted after it is divided into four fields, pixels contained in these fields are synthesized, and the result of the synthesis operation is output. On the other hand, an image with movement is processed according to a procedure that mainly consists of two processes; namely intra-field interpolation and frequency conversion. In the case of images with movement it is not possible to make use of data about a previous field. This means that desired pixels must be generated from data about a current field by an interpolation technique.

On the other hand, the NTSC signal processing board separates a received NTSC signal into a Y signal, an R-Y signal, and a B-Y signal. An NTSC signal is fed in the form of a blend of a luminance signal Y and a chrominance signal C, and thus it is necessary to perform a Y/C separation process that is the NTSC signal processing board's main function. The signal C is a signal that makes a phase-inversion for every one scanning line and for every one frame. This makes it possible to fetch only the signal Y by adding a current pixel and a pixel one scanning line ahead thereof, and it is also possible to fetch only the signal C by means of subtraction. However, there actually exists a location difference between a pixel and a pixel one scanning line ahead thereof, which prevents the Y/C separation from being performed successfully. To deal with this problem, a pixel at the same location as a current pixel is first pseudo-found from an average of vertical lines and thereafter addition/subtraction operations are performed for the Y/C separation to be performed completely. For the case of images without movement, the complete Y/C separation can be carried out by making use of a pixel one frame ahead of a current pixel.

As described above, conventional TV receivers have to contain a plurality of signal processing boards for compatibility with different types of TV broadcasting systems. This results in the increase in costs. Additionally, to catch up with new TV broadcasting systems that are expected to be put to practical use in the future, new signal processing boards corresponding to these new systems must be developed. This requires much development work, thereby increasing the development cost.

The conventional TV receiver has some problems. For example, in order to perform vertical/horizontal synchronization when outputting a picture to a CRT, it is necessary to operate the entire TV receiver at different system clock signals having different frequencies depending on the input video signal type. That is, a system clock frequency of 16.2 MHz is used in the case of the MUSE system, and 14.3 MHz in the case of the NTSC system. When aiming at achieving high-speed image processing, sampling clock processing for phase lock becomes a barrier to increasing the system clock signal frequency (i.e., the processing frequency). There may be a way capable of realizing high-speed processing without increasing the system clock signal frequency such as parallel processing. This way, however, produces the problem that the amount of hardware increases.

SUMMARY OF THE INVENTION

It is a first object of the present invention to provide a video signal processor and a video signal processing technique in order that common hardware to different broadcasting systems and process switching functions by software are realized.

It is a second object of the present invention to process a video signal at a frequency higher than a sampling rate of the video signal while maintaining input-to-output synchronization.

The sum-of-products arithmetic operation to compute the inner product of two vectors is most commonly used in signal processing; more specifically, the arithmetic operation to compute the inner product of a data vector $p=(p_0, p_1, \ldots, p_n)$ and a sum-of-products vector $a=(a_0, a_1, \ldots, a_n)$ (i.e., $p.a=a_0*p_0+a_1*p_1+\ldots+a_n*p_n$). Based on this, the present invention provides, in order to achieve the first object, a technique in which a parallel sum-of-products arithmetic unit is program-operated by a processing means for, for example, channel control. Additionally, data store means are provided on both the input side and the output side.

The above-described configuration permits a single parallel sum-of-product arithmetic means to be shared between signal processing of various broadcasting systems. The provision of the input- and output-side storage means makes it possible to absorb differences between the processing speed of the processing means and the input/output rate.

To achieve the second object, the present invention provides a video signal processor. This video signal processor comprises:

(a) first and second storage means for storing plural items of pixel data.

(b) an address generator for generating a write address of the first storage means in order that pixel data obtained by sampling a video signal is sequentially written in the first storage means in synchronism with a synchronizing signal, and a read address of the second storage means in order that pixel data is sequentially read out of the second storage means in synchronism with the synchronizing signal, and (c) a processing means for reading pixel data from the first storage means, processing the read pixel data, and writing the processed pixel data in the second storage means, at an operating frequency higher than a sampling rate of the video signal.

As a result of such an arrangement, the head of pixel data for one scanning line stored in the first storage means can be identified by an address, and the processing means can conduct processing while synchronizing the pixel location regardless of the synchronizing signal. Therefore, it is possible to conduct processing at an operating frequency different from the input video signal sampling rate.

BRIEF DESCRIPTION OF THE DRAWINGS

FIG. 20 is an address mapping diagram of an input-side frame memory of FIG. 19.

FIG. 27 is a circuit diagram of a vertical filter section of FIG. 26.

DETAILED DESCRIPTION OF THE INVENTION

The present invention pertains to a TV receiver having the capability of receiving both a MUSE signal and an NTSC signal. Preferred embodiments of the present invention are described by making reference to the accompanying drawings.

Embodiment 1

Figure 1:
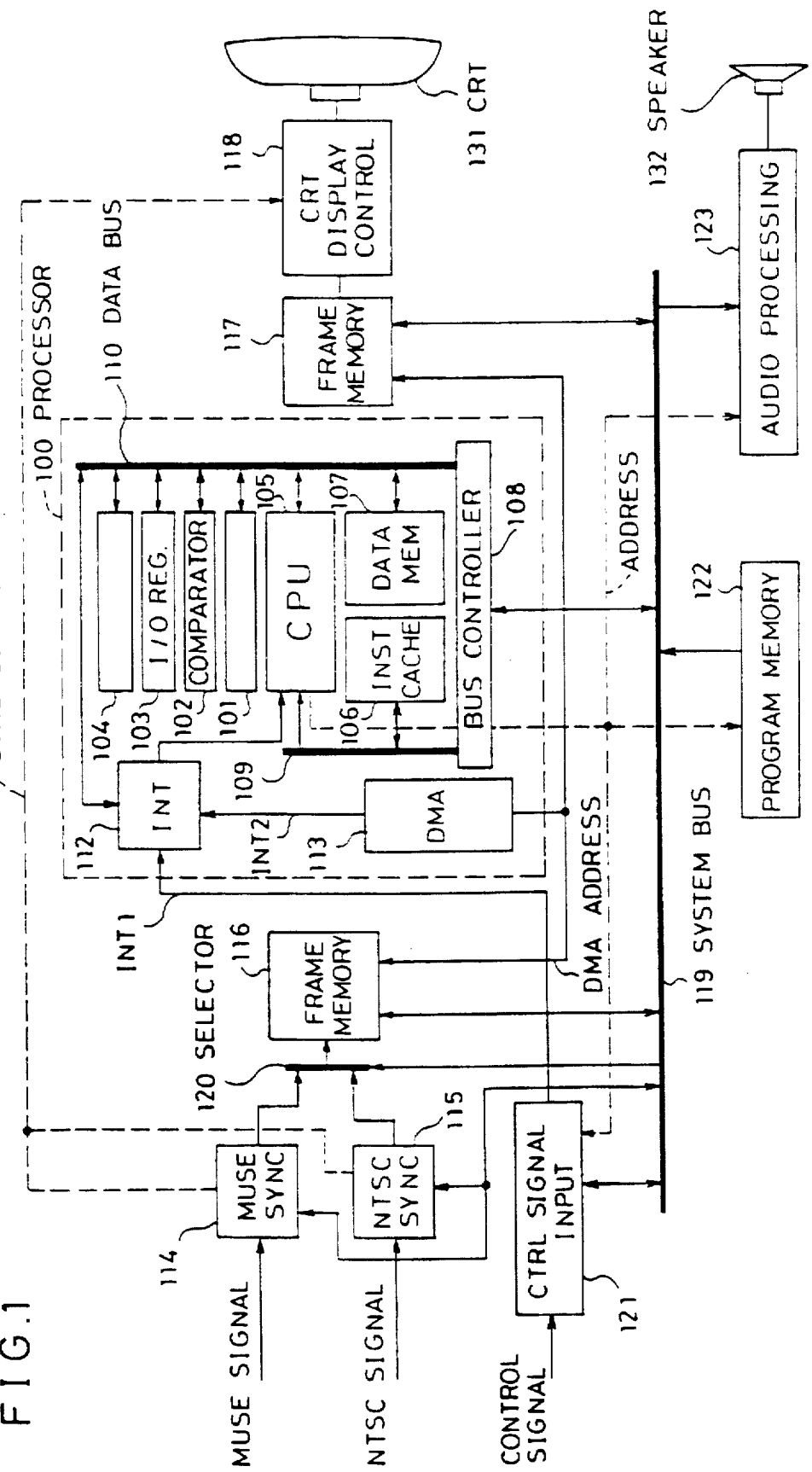
FIG. 1 is a block diagram of a first TV receiver of the present invention capable of receiving both a MUSE signal and an NTSC signal.

Referring now to FIG. 1, a first TV receiver of the first embodiment is described. A processor 100 of FIG. 1 has a parallel sum-of-products arithmetic section (PSAS) 101; a comparator 102; an input/output (I/O) register section 103; a sum-of-products factor register section (SFRS) 104; a central processing unit (CPU) 105; an instruction cache 106; a data memory 107; a bus controller 108; an interruption control section 112; and a DMA controller 113. Of these components, the PSAS 101, the comparator 102, the I/O register section 103, and the SFRS 104 together form a coprocessor to the CPU 105. The CPU 105, the instruction cache 106, and the bus controller 108 are interconnected via an instruction bus 109. The coprocessor, formed by the elements 101–104, the CPU 105, and the data memory 107, and the bus controller 108 are interconnected via a data bus 110.

On receipt of a MUSE signal, a MUSE sync circuit 114 performs analog-to-digital conversion of the received MUSE signal at a sampling rate of 16.2 MHz, and this converted signal is output together with a synchronizing signal. On the other hand, on receipt of an NTSC signal, an NTSC sync circuit 115 performs analog-to-digital conversion of the received NTSC signal at a sampling rate of 14.3 MHz, and this converted signal is output together with a synchronizing signal. Each of the sync circuits 114 and 115 has the capability of synchronizing the received signal and fetching a video signal of a channel selected. A selector 120 is capable of selecting between two different signals (that is, the MUSE signal and the NTSC signal) and outputting a selected signal to a frame memory 116 provided on the input side. That is, this frame memory 116 serves as a memory for storing input pixels. A frame memory 117 is provided on the output side, which stores image data for display. A CRT display control section 118 exerts control in order that data of the frame memory 117 is displayed on a CRT 131 while it (the memory 117) performs a function of changing the dimensions of the frame depending on the synchronizing signals from the MUSE sync circuit 114 and the NTSC sync circuit 115. In other words, the frame memories 116 and 117 provided on the input- and output-sides are shared between the MUSE system and the NTSC system. In the present invention, processed video information is output to the CRT 131 where it is displayed. However, such video information may be stored in, for example, a disk.

A control signal input section 121 sends an interruption signal to the processor 100 in response to an external control signal given off from, for example, a TV remote controller carrying requests such as a request for channel change and a request for volume change. The control signal input section 121 has an internal register for holding a channel number set or the like. A program memory 122 stores instructions to be executed by the processor 100. An audio processing section 123 receives an audio signal from the input-side frame memory 116. Volume is set by a signal from the processor 100 to the audio processing section 123. Reference numeral 132 indicates a loudspeaker. The processor 100, the MUSE sync circuit 114, the NTSC sync circuit 115, the selector 120, the frame memory 116, the frame memory 117, the control signal input section 121, the program memory 122, and the audio processing section 123 are interconnected via a system bus 119.

Figure 2:
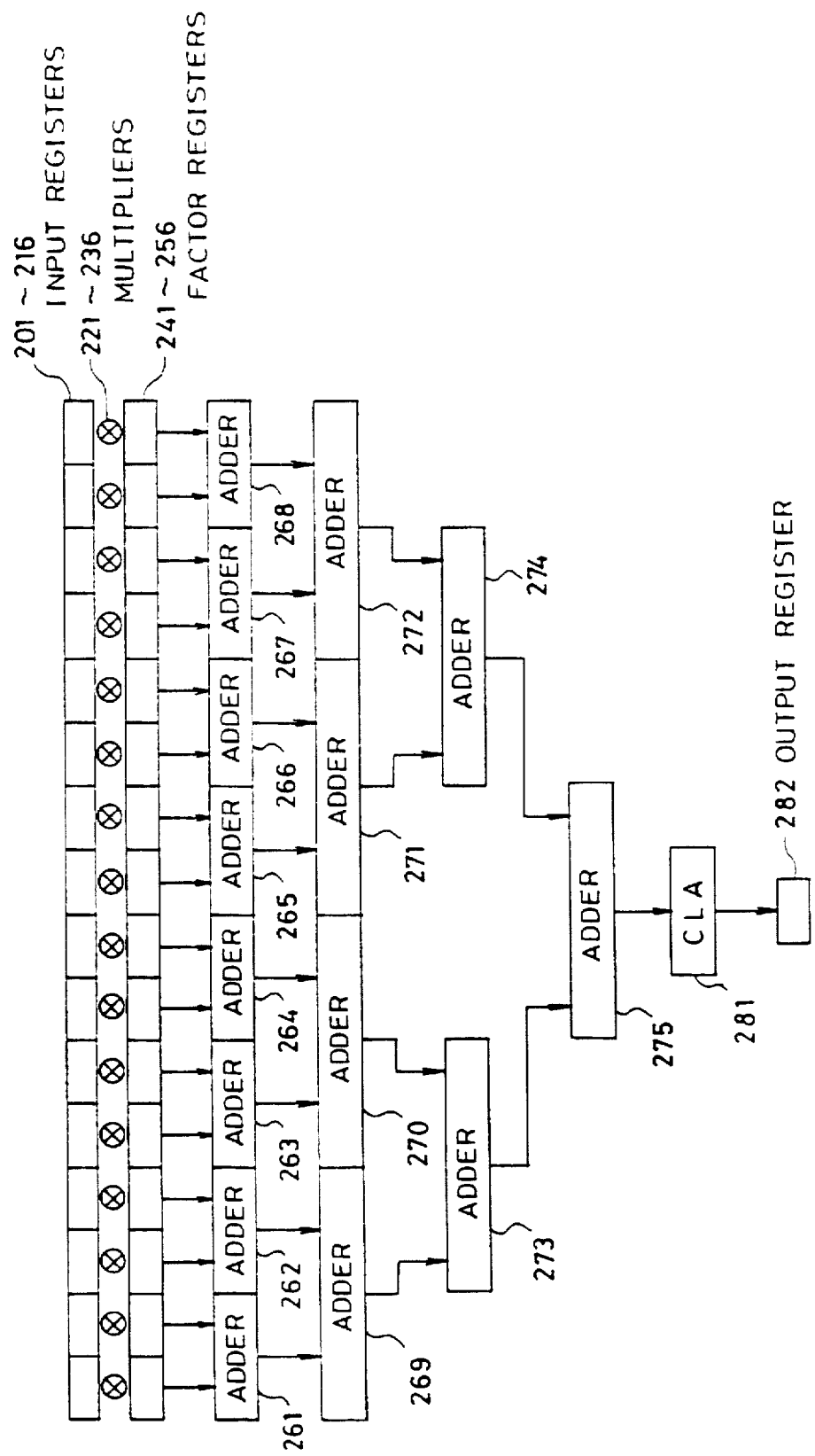
FIG. 2 is a block diagram showing internal structures of a parallel sum-of-products arithmetic unit section, an input/output register section, and a sum-of-products factor register of FIG. 1.

FIG. 2 is a block diagram showing the PSAS 101, the I/O register section 103, and the SFRS 104 of FIG. 1. 16 input registers 201–216 are provided. These input registers 201–216 together form a part of the I/O register section 103, and they are 8-bit registers for storing pixel data. It is possible to make the input registers 201–216 store the output of the PSAS 101 or the output of the comparator 102 fed through the data bus 110. An output register 282 forms a part of the I/O register 103. This output register 282 stores the result of the arithmetic operation performed by the PSAS 101. There are provided 16 factor registers 241–256. These factor registers 241–256 together form a part of the SFRS 104, and they are 4-bit registers for storing factors being used when performing sum-of-products arithmetic operations.

There are provided 16 multipliers 221–236 that together form a part of the PSAS 101. These 16 multipliers 221–236 perform multiplication operations of data stored by the 16 input registers 201–216 and data stored by the 16 factor registers 241–256. That is, data stored by an input register is multiplied by data stored by a corresponding factor register. 15 adders 261–275 are provided which are tree-interconnected and which together form a part of the PSAS 101. These adders are used to sum products found by the multipliers 221–236.

A carry look-ahead circuit (CLA) 281 is provided which forms a part of the PSAS 101. This CLA 281 has the capability of converting the result of the addition operation represented by a redundant binary number to a simpler binary number. Each of the adders 261–275 has a structure capable of directly writing the result of the arithmetic operation to the I/O register 103 through the data bus 110, without passing through the CLA 281.

Figure 3:
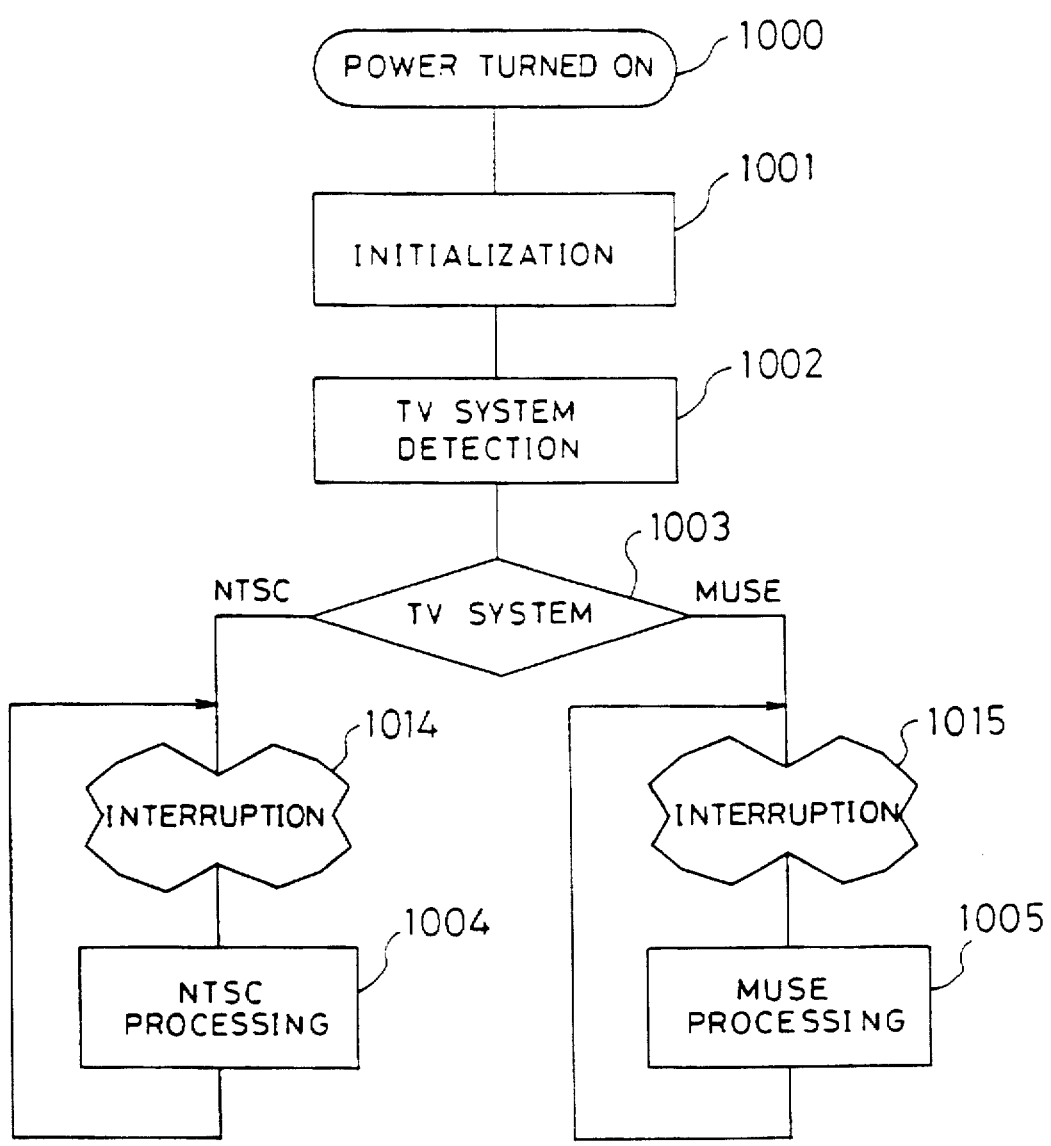
FIG. 3 is an operation flowchart of the main routine of the first TV receiver.
Figure 4:
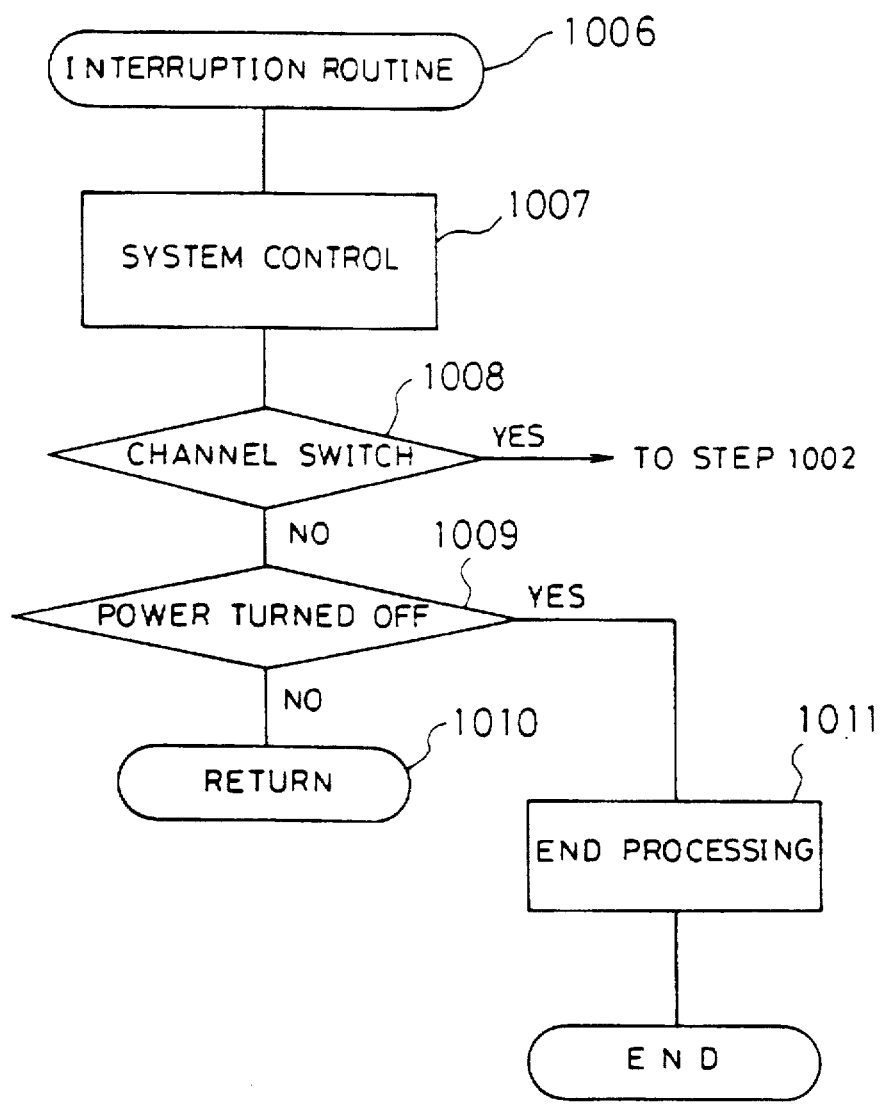
FIG. 4 is an operation flowchart of the interruption handling routine of the first TV receiver.

With reference to FIGS. 3 and 4, the operation of the first TV receiver is described. FIG. 3 is an operation flowchart of the main routine of the first TV receiver. FIG. 4 is an operation flowchart of the interruption handling routine of the first TV receiver.

As shown in FIG. 3, when power is turned on, a reset occurs to the processor 100 (STEP 1000). Then, the processor 100 starts running a program at the initial address of the program memory 122. This initializes all of the PSAS 101, the comparator 102, the I/O register section 103, the SFRS 104, the CPU 105, the instruction cache 106, the data memory 107, the bus controller 108, the interruption control section 112, and the DMA controller 113 (STEP 1001). Individual instructions forming the program are taken into the CPU 105 from the program memory 122 through the bus controller 108 and the instruction bus 109, while at the same time these instructions are stored in the instruction cache 106. Therefore, instruction readout can be performed at a high speed from the next time and high-speed image processing becomes possible.

Next, the broadcasting system is detected depending on the channel set at initialization time (STEP 1002). Then, the program branches to a MUSE processing step (STEP 1005) or to an NTSC processing step (STEP 1004) according to the result of STEP 1003 that is a step of identifying the broadcasting system. Thereafter, each image processing goes into an endless loop until an interruption signal is applied.

If a request for channel change is made during the MUSE processing (STEP 1005), this applies a control signal to the control signal input section 121. As a result, the requested channel number is set to an internal register of the control signal input section 121. Then, the control signal input section 121 outputs an interruption signal to the interruption control section 112 within the processor 100. Next, the interruption control section 112 outputs to the CPU 105 a signal of interruption level set at the initialization time. This causes an interruption (STEP 1015), and the program branches to an interruption handling routine step (STEP 1006) of FIG. 4. Even if a request for channel change is issued during the NTSC processing (STEP 1004), this also causes an interruption (STEP 1014) so that the program branches to STEP 1006 (i.e., the interruption handling step).

In the interruption handling routine of FIG. 4, the program proceeds to a system control processing step (STEP 1007) for, for example, setting the volume. Then, the program proceeds to a channel change routine step (STEP 1008) for checking if the interruption factor is a channel setting change. From STEP 1008, the program then branches to STEP 1002. At STEP 1002, the broadcasting system is identified according to the channel number set to the internal register of the control signal input section 121. Depending upon the result of the broadcasting identification step (STEP 1003), the program branches to STEP 1005 (i.e., the MUSE processing step) or to STEP 1004 (the NTSC processing step). As described above, both the MUSE processing and the NTSC processing are an endless loop, so that the same routine is repeatedly performed until the next interruption occurs.

If a request for volume change is issued during the MUSE processing (STEP 1005) or during the NTSC processing (STEP 1004), this also causes an interruption (STEPS 1015 and 1014). Then, the program branches to STEP 1006. At STEP 1006, a volume set signal is applied by STEP 1007 to the audio processing section 123. In this case, unlike the channel change, a RETURN instruction of STEP 1010 is executed because processing that is under operation at the time of the occurrence of an interruption must be continued. If the interruption factor is "switch-off", the program goes to a switch-off check step (STEP 1009). Then, end-of-processing (STEP 1011) is performed and the program is over (see FIG. 4).

Figure 5:
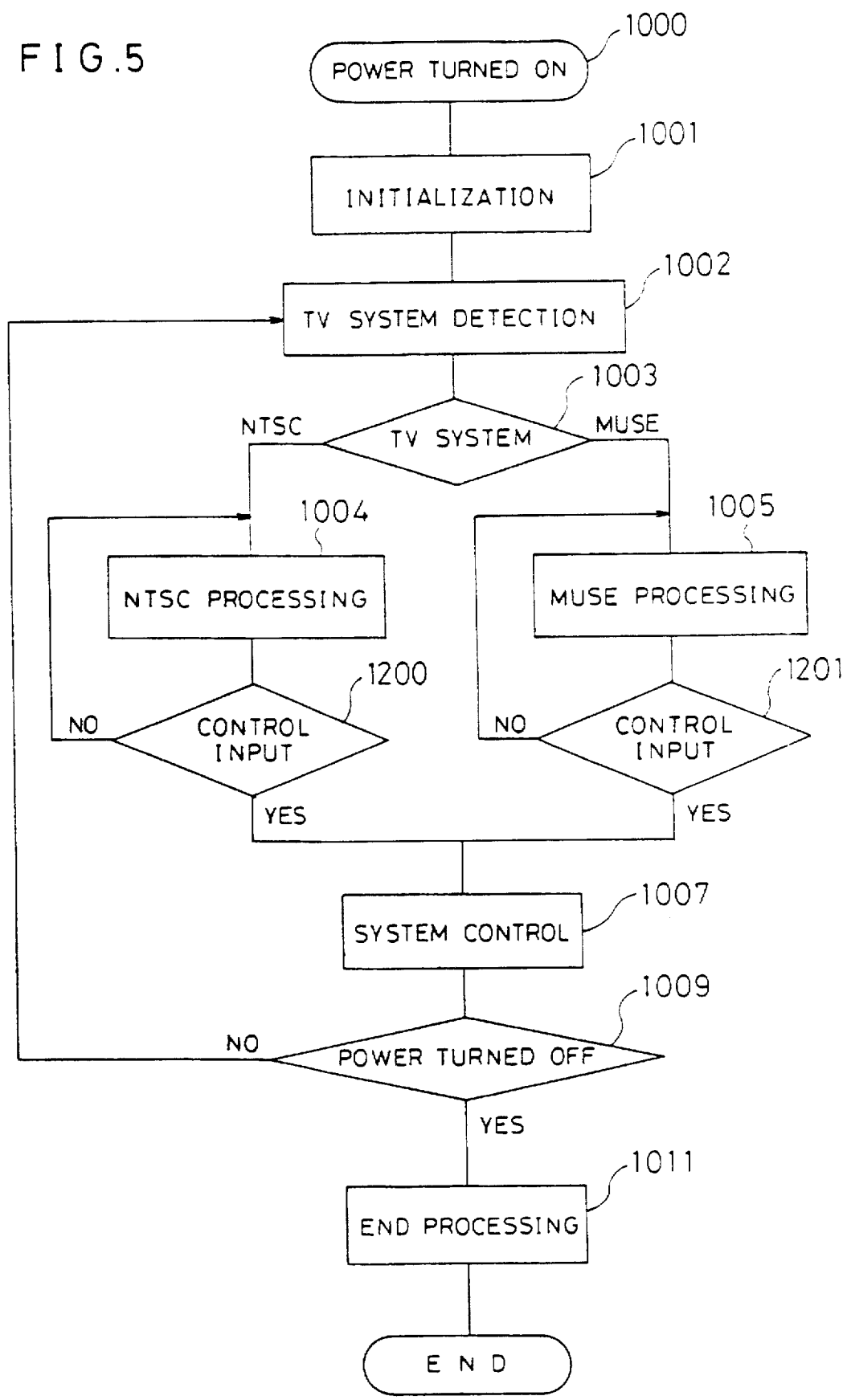
FIG. 5 is an operation flowchart of the first TV receiver that employs a polling method.

The operation of the first TV receiver employing an interruption handling technique has been described. Instead of employing the interruption handling technique, a polling technique, shown in FIG. 5, may be useful. In FIG. 5, STEPS 1201 and 1200 are a control signal identification routine. In the polling technique, after STEP 1005 or STEP 1004, the CPU 105 reads an internal register of the control signal input section 121 so as to check for the application of control signals (for example, the presence or absence of a request for channel change) (STEPS 1201 and 1200). At the same time the CPU 105 proceeds with the processing. The read operation of the internal register of the control signal input section 121 is performed through the system bus 119. For example, if the control signal input section 121 receives a control signal during the MUSE processing (STEP 1005), the program branches from STEP 1201 to a system control processing step (STEP 1007). As a result of such arrangement, the same function as realized by the interruption handling method can be realized.

The internal operation of the processor 100 is detailed in terms of the MUSE processing (STEP 1005) and the NTSC processing (STEP 1004) through examples. In the description of the MUSE processing, intra-field interpolation and aliasing distortion deletion are explained. In the description of the NTSC processing, Y/C separation is explained.

Figure 6:
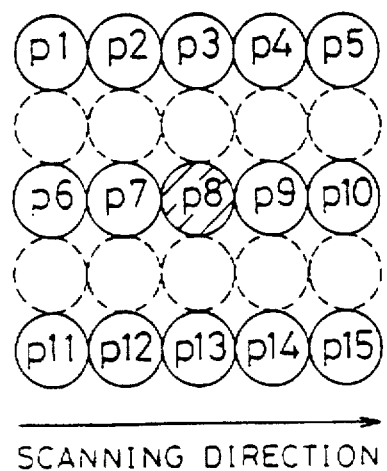
FIG. 6 shows a structure of an NTSC input pixel data received by the first TV receiver.
Figure 7:
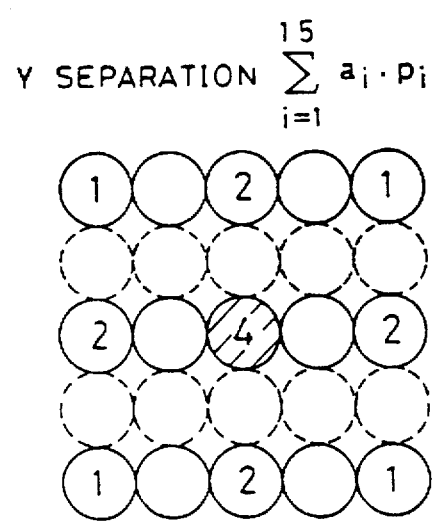
FIG. 7 shows a structure of a sum-of-products factor for the NTSC Y separation in the first TV receiver.
Figure 8:
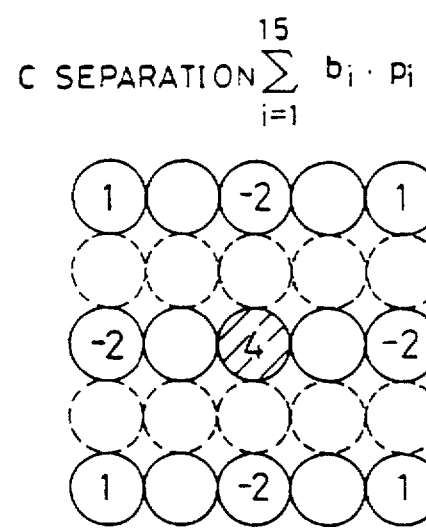
FIG. 8 shows a structure of a sum-of-products factor for the NTSC C separation in the first TV receiver.

With the help of FIGS. 6–12, Y/C separation in terms of the NTSC system is described. FIG. 6 shows an input pixel data structure of the NTSC system. FIG. 7 shows a structure of a sum-of-products factor for NTSC Y separation. FIG. 8 shows a structure of a sum-of-products factor for NTSC C separation. Each pixel is sampled at a sampling rate of 4 fsc (=14.3 MHz) (i.e., four times the chrominance subcarrier frequency).

FIG. 6 shows pixel data items p1–p5, p6–p10, and p11–p15, each group representing one scanning line. To perform a Y/C separation operation, each pixel is multiplied by a respective factor and those products are added. FIG. 7 shows sum-of-products factor values for the luminance signal Y separation in which the center pixel data item p8 is a pixel data item subject to arithmetic operations. Other pixel data items without sum-of-products factor value indications have sum-of-products factor values of zero. This sum-of-products arithmetic operation can be written as follows:

$$p1+2*p3+p5+2*p6+4*p8+2*p10+p11+2*p13+p15 \qquad (1).$$

As a result, the Y signal separation is performed. FIG. 8 shows sum-of-products factor values for the chrominance signal C separation. This sum-of-products arithmetic operation can be written as follows:

$$p1-2*p3+p5-2*p6+48p8-2*p10+p11-2*p13+p15 \qquad (2).$$

As a result, the C signal separation is performed. Here, eight pixel data items locating next to the pixel data item p8 are included in the formulae (1) and (2), taking into account the continuity of the pixel data item p8 to each of its adjoining pixel data items.

Figure 9:
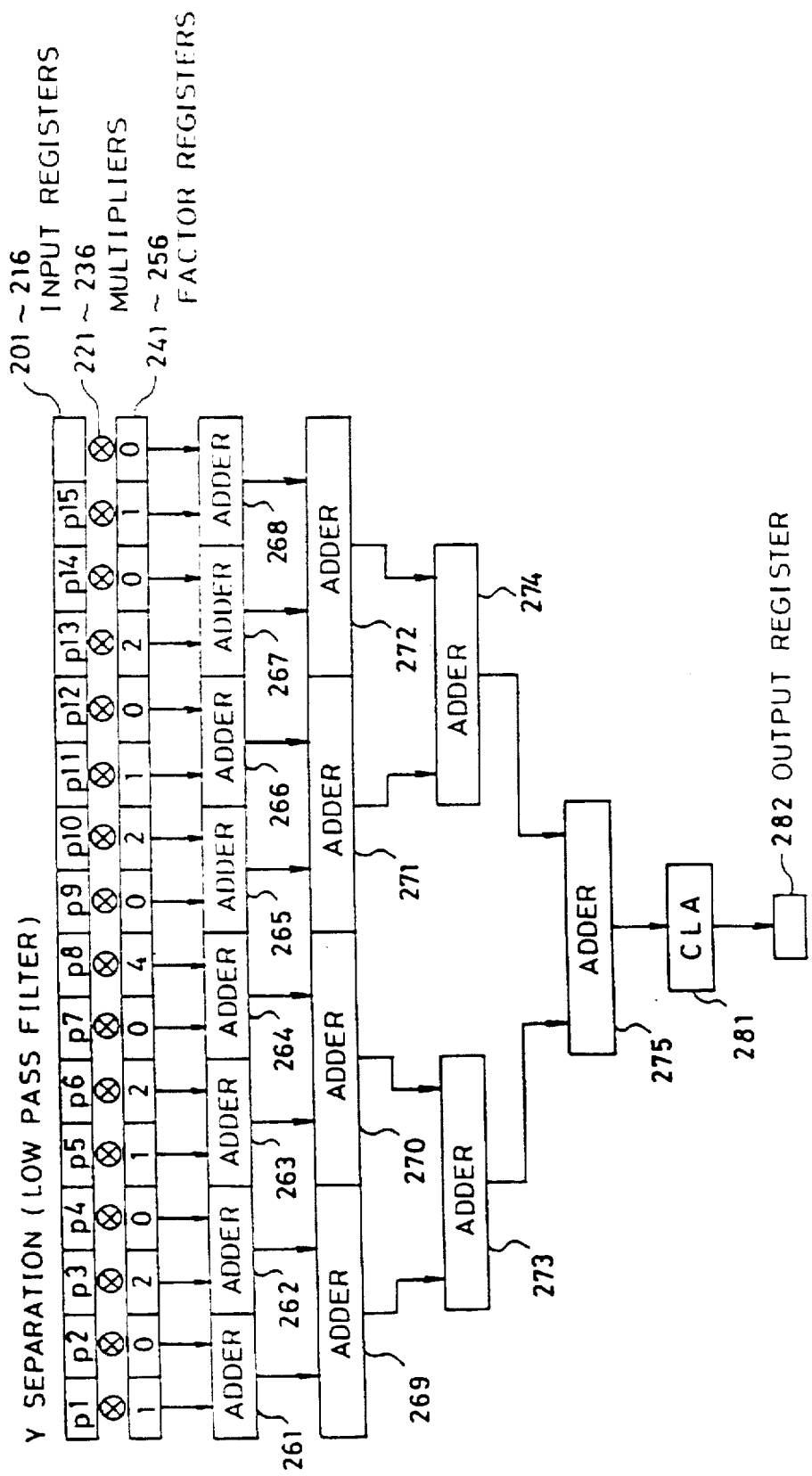
FIG. 9 shows data setting to the input/output register section as well as to the sum-of-products factor register section when performing sum-of-products arithmetic operations for the NTSC Y separation in the first TV receiver.
Figure 10:
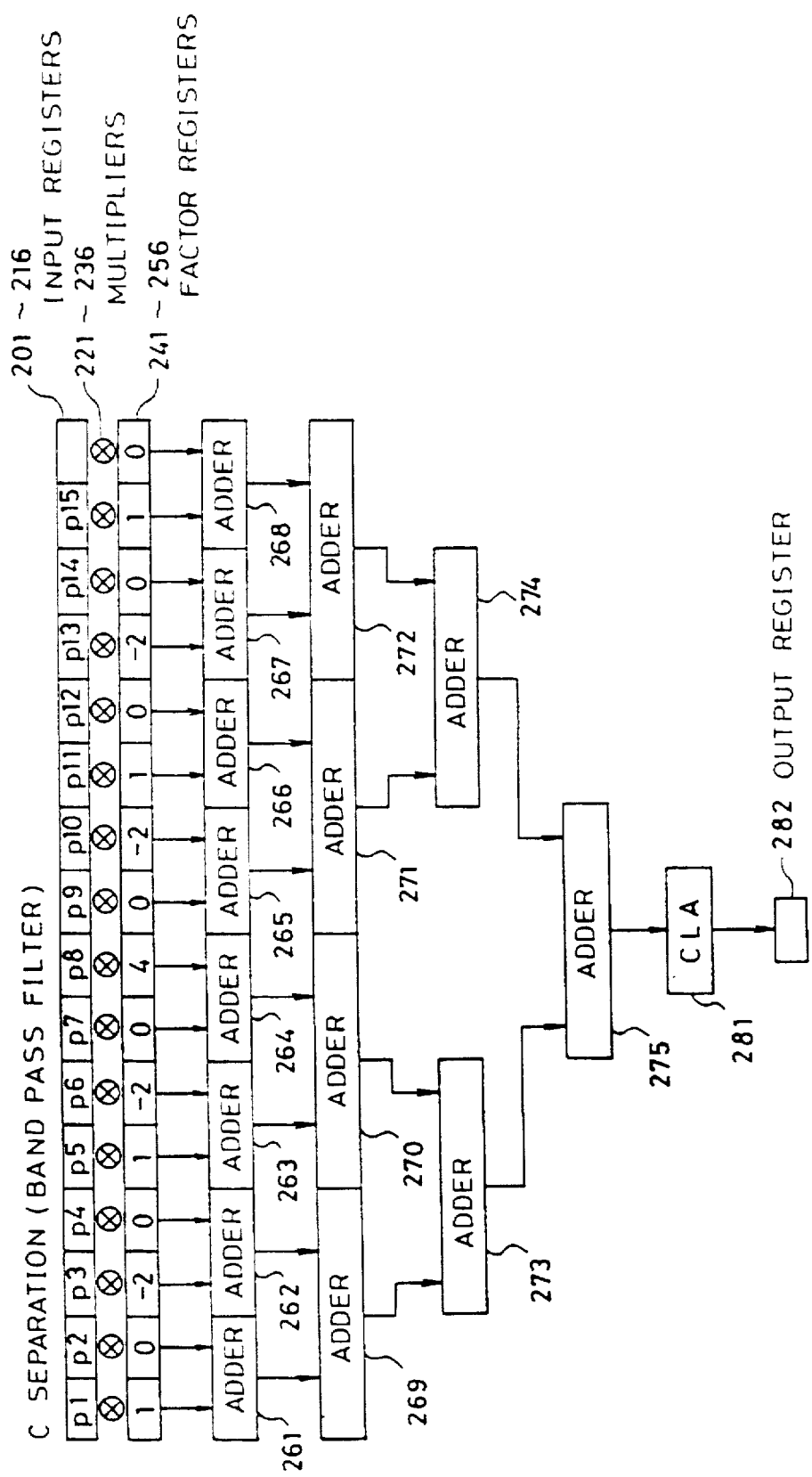
FIG. 10 shows data setting to the input/output register section as well as to the sum-of-products factor register section when performing sum-of-products arithmetic operations for the NTSC C separation in the first TV receiver.

FIG. 9 shows the setting of data in performing the formula (1) for the Y separation. The input registers 201–215 store respective pixel data items (i.e., p1–p15 of FIG. 6). The factor registers 241–255 store respective sum-of-products factors (see FIG. 7). Corresponding sum-of-products factors to the pixel data items p2, p4, p7, p9, p12, and p14 are zeros. The input register 216 that is a sixteenth input register is not used and thus its corresponding factor register (i.e., the factor register 256) is assigned a sum-of-products factor of 0. At the time when performing the formula (2) for the C separation, the contents of the factor registers 241–255 are changed to the sum-of-products factors of FIG. 8, as shown in FIG. 10.

Figure 11:
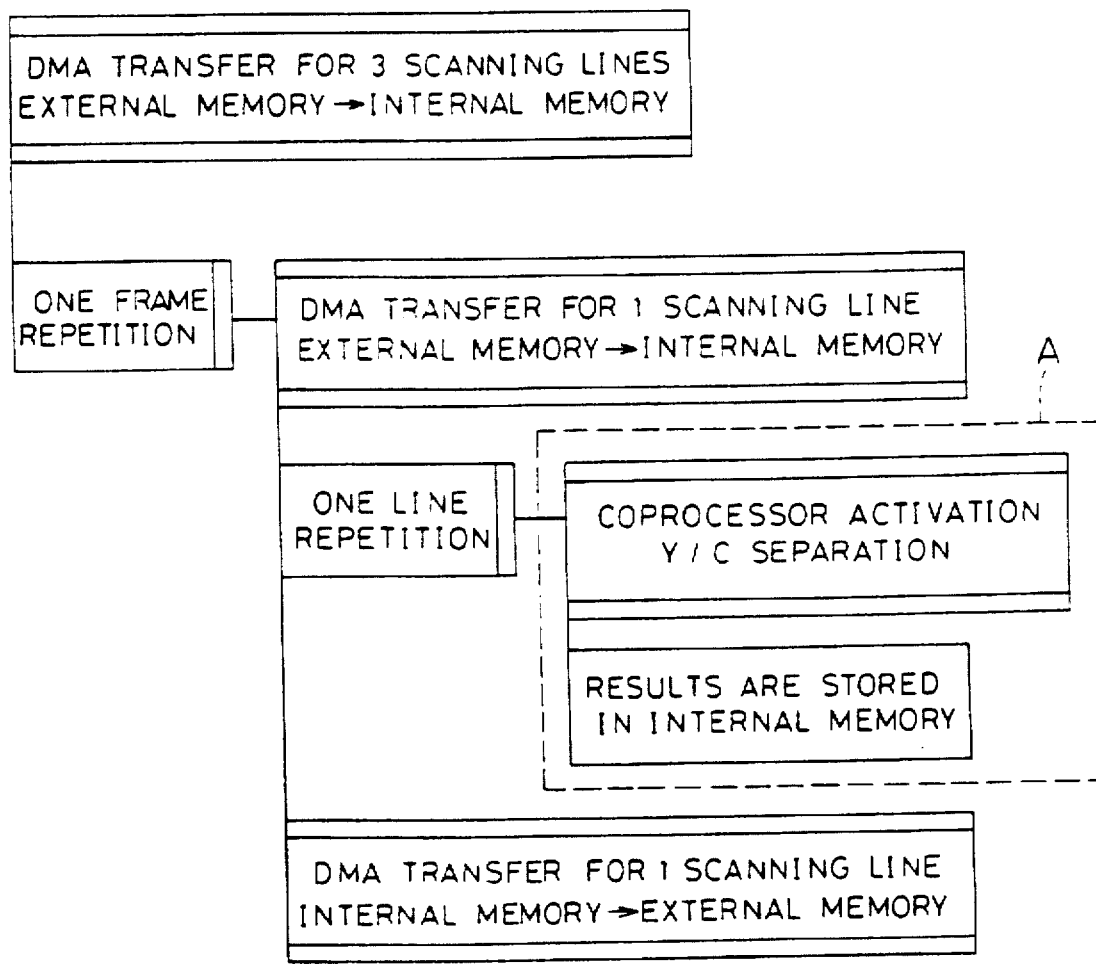
FIG. 11 shows in detail the NTSC Y/C separation procedure in the first TV receiver.

The procedure of the NTSC processing (i.e., STEP 1004 of FIG. 3) by the processor 100 is detailed in the form of a problem analysis diagram (PAD) of FIG. 11. In order that pixel data for three scanning lines is DMA-transmitted from the input-side frame memory 116 (i.e., the external memory) to the data memory 107 (i.e., the internal memory) via the bus controller 108, the CPU 105 sets a transfer start address and transfer data count to an instruction register. This initializes the data memory 107 for later processing. Termination of the transfer of data is reported by an interruption signal from the DMA controller 113 to the CPU 105 through the interruption control section 112.

Further, instructions are sent to the DMA controller 113 in order that pixel data for one scanning line is DMA-transmitted from the input-side frame memory 116 to the data memory 107. Next, the CPU 105 activates the PSAS 101 that then performs arithmetic operations for the Y/C separation. That is, pixel data items are set to the input registers 201–215 of the I/O register section 103, sum-of-products factors are set to the factor registers 241–256 of the SFRS 104 (see FIG. 9), and the PSAS 101 performs sum-of-products operations for the Y separation. Then, the sum-of-products factor setting is changed (see FIG. 10), and the PSAS 101 performs sum-of-products operations for the C separation. Individual arithmetic operation results are read out of the I/O register section 103 and are stored in the data memory 107 (i.e., the processing "A" of FIG. 11). This processing "A" is repeated for every pixel of a single scanning line. Upon completion of the Y/C separation for one scanning line, the CPU 105 issues an instruction to the DMA controller 113 in order that the arithmetic operation result for one scanning line is transferred from the data memory 107 to the output-side frame memory 117 (i.e., the external memory). The above-described processing is repeatedly performed for all the scanning lines of one frame.

Figure 12:
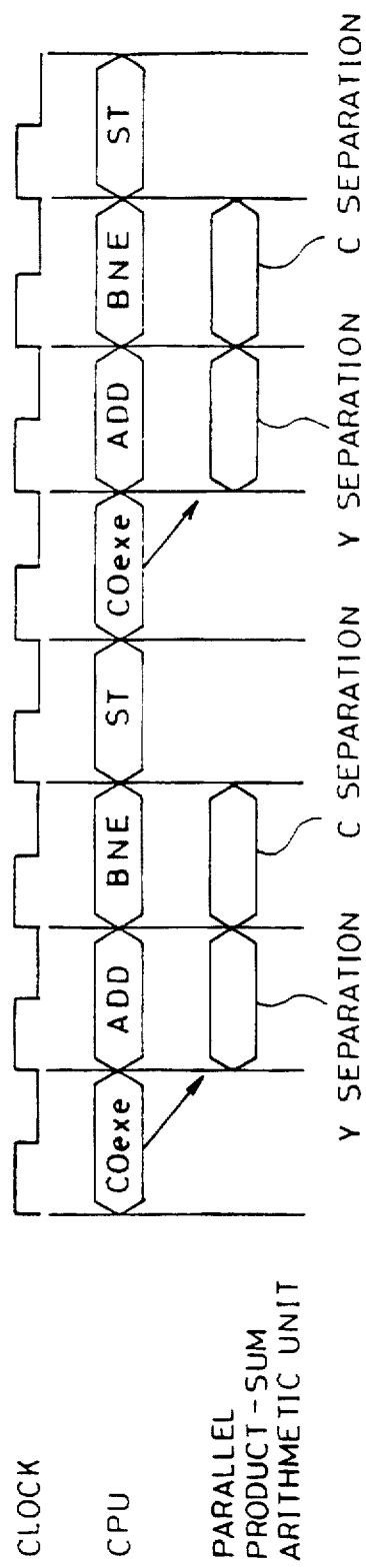
FIG. 12 shows timing of a central processing unit and the parallel sum-of-products arithmetic unit section as to the processing of "A" of FIG. 11.

FIG. 12 shows timing of the CPU 105 and the PSAS 101 in terms of the processing "A" of FIG. 11. Execution of a $CO_{exe}$ instruction (i.e., a coprocessor activation instruction) activates the PSAS 101, and pixel data items are read out of the data memory 107 to the input registers 201–215. At the next cycle, arithmetic operations for the Y separation are performed by the PSAS 101. At the following cycle, separation arithmetic operations for the C separation are performed by the PSAS 101. While the PSAS 101 is performing these operations for the Y/C separation, the CPU 105 performs address increment by an ADD (addition) instruction and checks if pixel processing for one scanning line is completed by a BNE (conditional branch) instruction. On completion of the arithmetic operation for the Y/C separation, the CPU 105 issues an ST (store) instruction in order that the arithmetic operation result is stored in the data memory 107. By repetition of the above-described operation, high-speed NTSC Y/C separation can be realized.

The Y/C separation of the present embodiment is two-dimensional; however, the present embodiment may find applications in three-dimensional Y/C separation in which intra-field arithmetic operations are performed.

Next, by reference to FIGS. 13–18, a MUSE luminance signal Y process is detailed.

Figure 13:
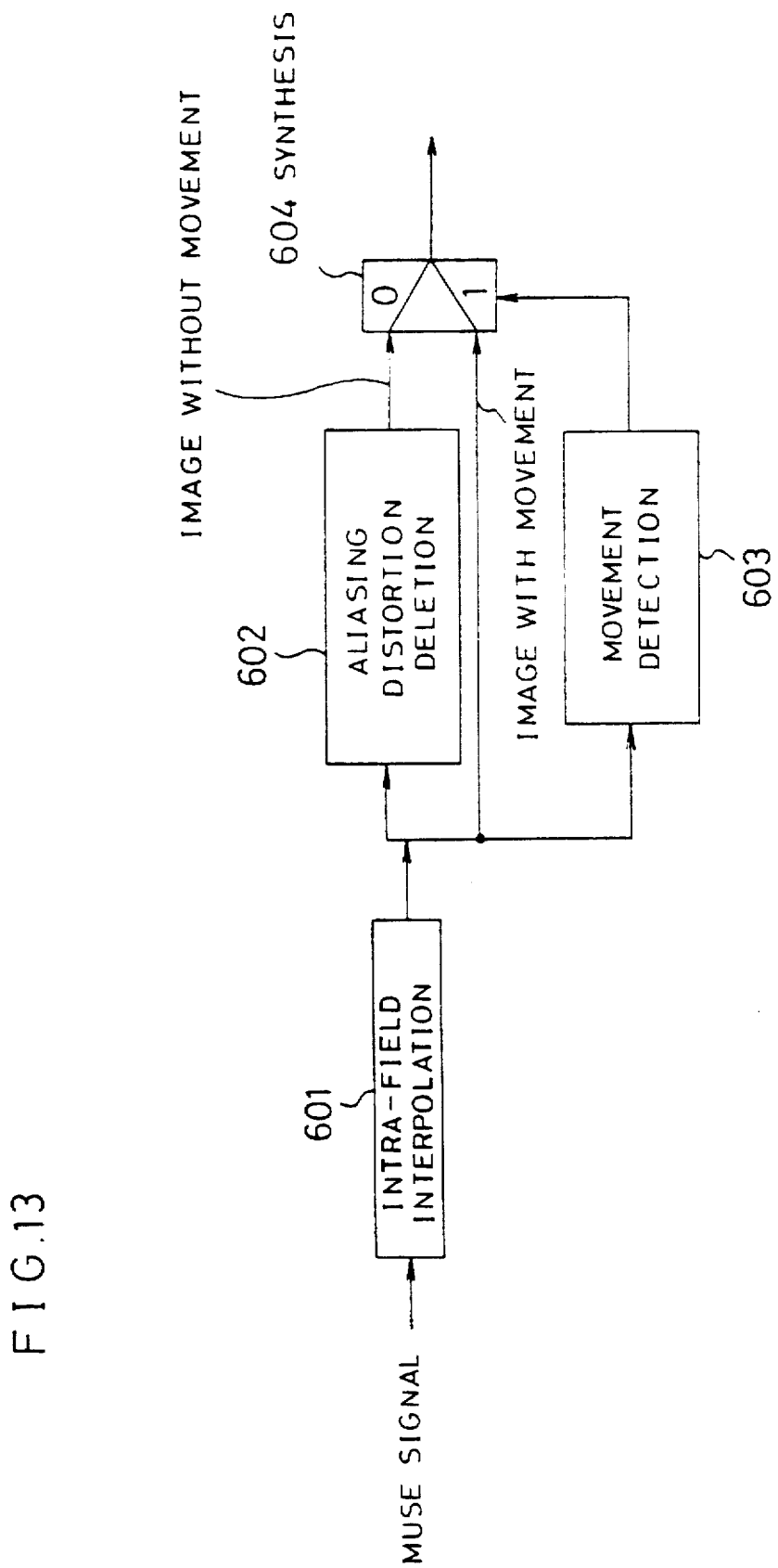
FIG. 13 shows the flow of MUSE image processing in the first TV receiver.

FIG. 13 shows the flow of MUSE image processing. To simplify the processing, an input MUSE signal is subjected to an intra-field interpolation process 601, regardless of the image type. In this case, aliasing distortion occurs to images without movement. Therefore, an aliasing distortion deletion process 602 is performed. In parallel with this aliasing distortion deletion process 602, a movement detection process 603 for identifying the image type (that is, an image with movement or an image without movement) is carried out. If the result of the movement detection process 603 is an image with movement, the result of the intra-field interpolation process 601 is selected at a later step, that is, in a synthesis process 604. If the result of the movement detection process 603 is an image without movement, the result of the aliasing distortion deletion process 602 is selected.

Figure 14:
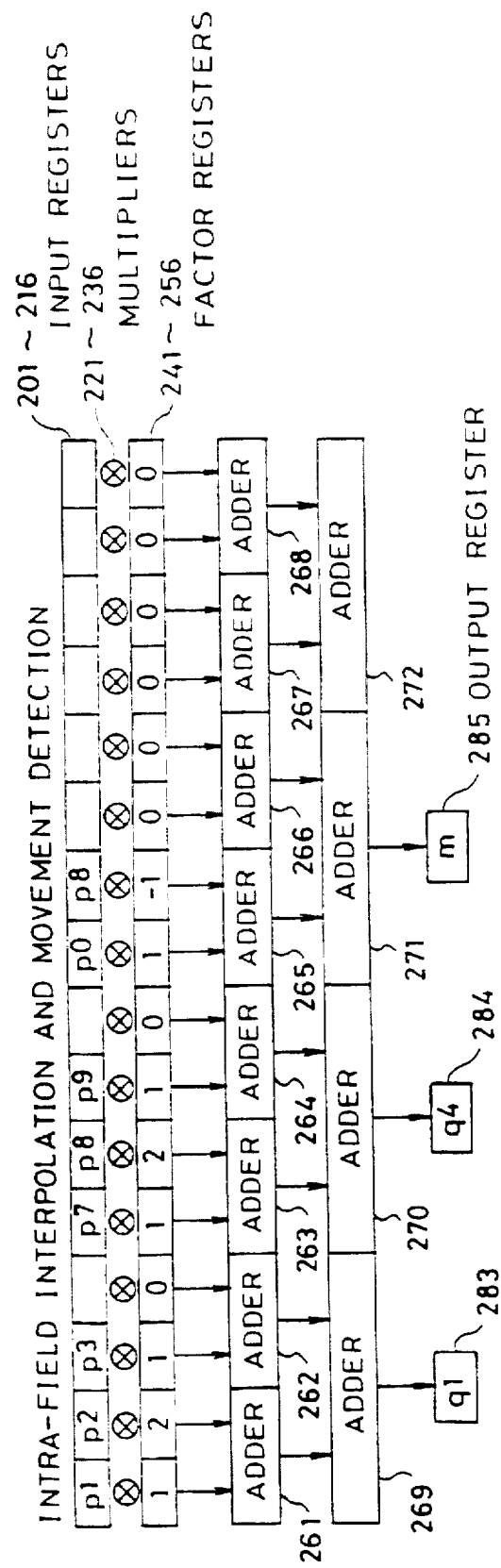
FIG. 14 shows data setting to the input/output register section as well as to the sum-of-products factor register section for intra-field interpolation and movement detection of FIG. 13, and arithmetic operation result storage.

Data setting for the intra-field interpolation process 601 and the movement detection process 603, and storage of the arithmetic operation result are shown in FIG. 14. Here, pixel data is set only to eight input registers of the 16 input registers 201–216. The pixel p8 is located in the same place as a pixel p0 two frames ahead of the pixel p8. The following sum-of-products operations are performed.

$$q1=p1+2*p2+p3 \tag{3}$$

$$q4=p7+2*p8+p9 \tag{4}$$

$$m=p0-p8 \tag{5}$$

These arithmetic operation results q1, q4, and m are stored in the three output registers 283–285 forming a part of the I/O register section 103. "q1" and "q4" are the results of the intra-field interpolation process. "m" is movement detection data.

Figure 15:
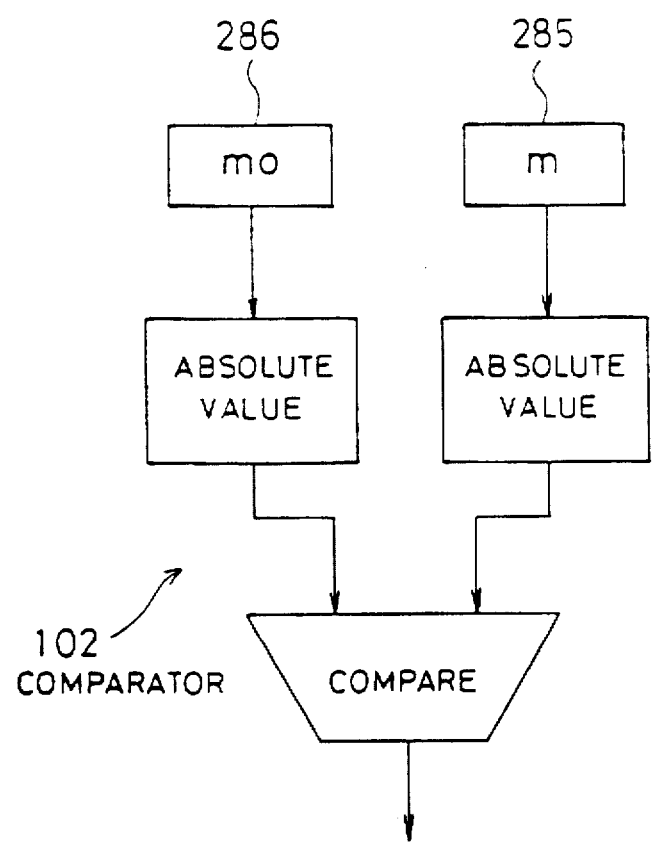
FIG. 15 shows a motion image identification process on the basis of the result of the movement detection of FIG. 14.

FIG. 15 shows an image with/without movement identification process. The comparator 102 makes a comparison between an absolute value of m from the register 285 and an absolute value of m0 that is a threshold, in order to identify the image type.

Figure 16:
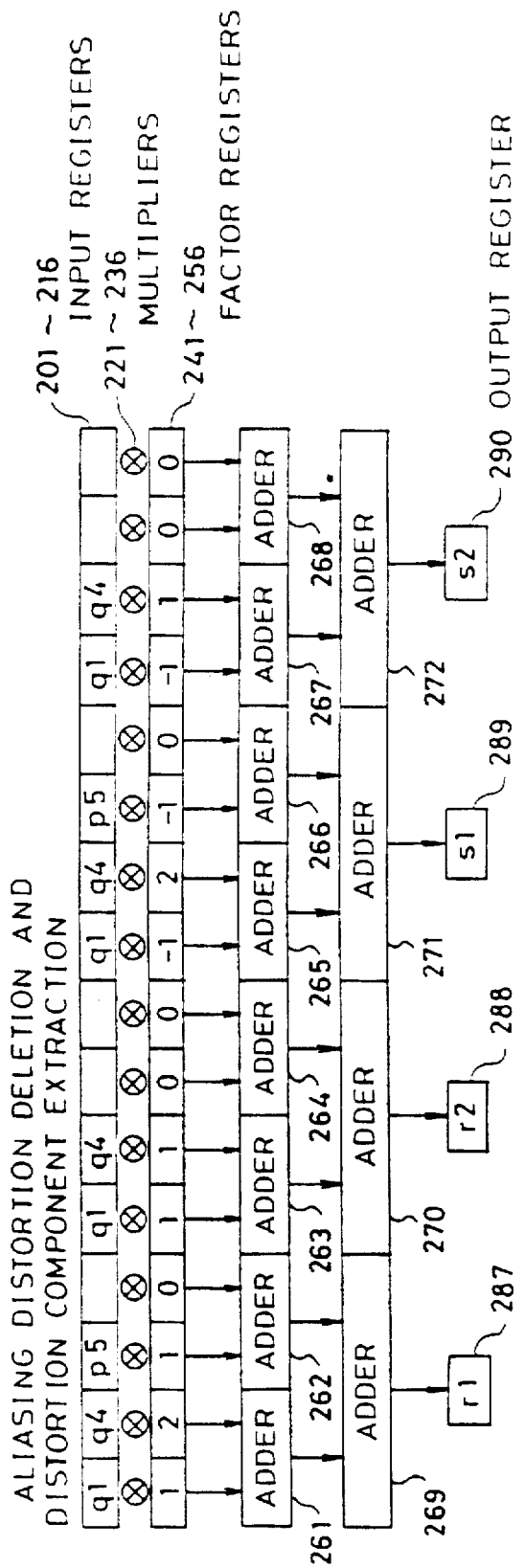
FIG. 16 shows aliasing distortion deletion and aliasing distortion component extraction of FIG. 13.

FIG. 16 shows data setting for the aliasing distortion deletion process 602 and an aliasing distortion component extraction process, and storage of the arithmetic operation result. Here, data including the result of the intra-field interpolation 601 is set only to ten of the 16 input registers 201–216. The following sum-of-products arithmetic operations are performed.

$$r1=q1+2*q4+p5 \tag{6}$$

$$r2=q1+q4 \tag{7}$$

$$s1=-q1+2*q4-p5 \tag{8}$$

$$s2=-q1+q4 \tag{9}$$

These results r1, r2, s1, and s2 are stored in the four output registers 287–290 forming a part of the I/O register section 103. "r1" and "r2" are the results of the aliasing distortion deletion processes (between frames and between fields). "s1" and "s2" are extracted aliasing distortion components (between frames and between fields).

Figure 17:
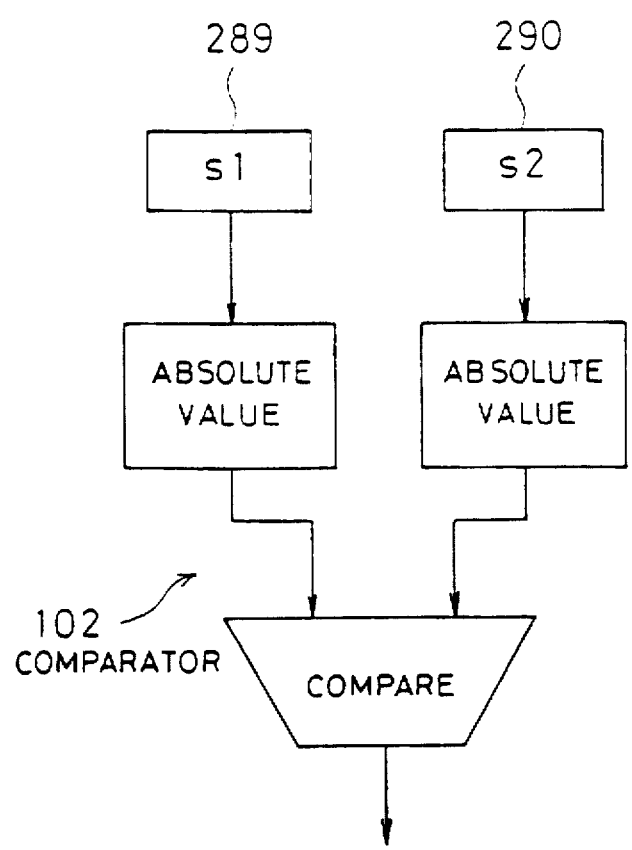
FIG. 17 shows a compare process in size between an inter-frame aliasing distortion component and an inter-field aliasing distortion component on the basis of the result of the arithmetic operation of FIG. 16.

FIG. 17 shows a comparison in size between an aliasing distortion component and another. More specifically, the comparator 102 makes a comparison between an absolute value of s1 from the register 289 and an absolute value of s2 from the register 290, in order to determine which one of the inter-frame aliasing distortion component and the inter-field aliasing distortion component is greater than the other.

A program for the above-described MUSE processing may be written by the assembly language as follows.

| | | |
|---|---|---|
| A: | LD | data read |
| | $CO_{exe1}$ | intra-field interpolation |
| | $CO_{exe2}$ | aliasing distortion deletion |
| | $CO_{exe3}$ | image-with/without-movement identification |
| | BL | branch to C if an image with movement is detected |
| | NOP | no operation |
| | $CO_{exe4}$ | comparison in size between aliasing distortion components |
| | BL | branch to B if inter-field aliasing distortion component is greater than inter-frame aliasing distortion component |
| B: | LD | data read |
| | STr2 | storage of data less inter-frame aliasing distortion |
| | JMP | branch to A |
| | $CO_{exe1}$ | intra-field interpolation |
| | STr1 | storage of data less inter-field aliasing distortion |
| | JMP | branch to A |
| | $CO_{exe1}$ | intra-field interpolation |
| C: | LD | data read |
| | STr5 | storage of interpolation data |
| | JMP | branch to A |
| | $CO_{exe1}$ | intra-field interpolation |

The $CO_{exe1}$ instruction written in a line next to the JMP instruction (i.e., an unconditional branch instruction) is executed at the time of the branch in question.

Figure 18:
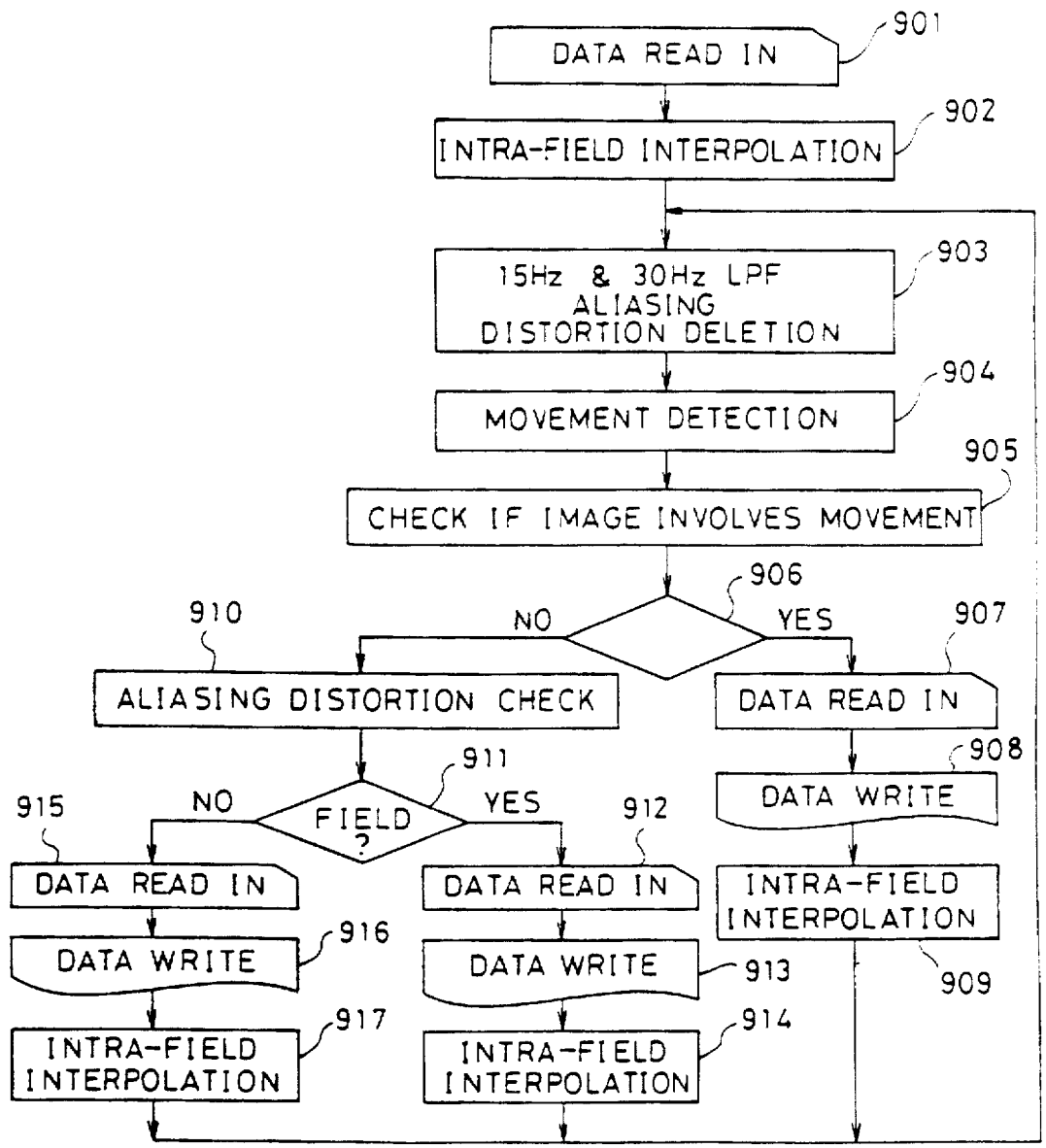
FIG. 18 is a flowchart showing in detail a MUSE image processing procedure in the first TV receiver.

FIG. 18 shows this program in the form of a flowchart. In the first place, the CPU 105 inputs data by the LD (load) instruction (STEP 901). Next, the CPU 105 performs intra-field interpolation and movement detection of FIG. 14 by the $CO_{exe1}$ instruction (STEPS 902 and 904). Then, the CPU 105 performs aliasing distortion deletion and aliasing distortion component extraction (STEP 903) of FIG. 16 by the $CO_{exe2}$ instruction. Next, the CPU 105 performs movement detection of FIG. 15 by the $CO_{exe3}$ instruction (STEP 905). Further, based on the result of this movement detection, the CPU 105 exerts branch control by the BL instruction (i.e., the conditional branch instruction) (STEP 906). In other words, if the movement detection result is an image with movement, the program proceeds to STEP 907. On the other hand, if the movement detection result is an image without movement, this makes the program proceed to STEP 910.

In the case of the detection of an image with movement, the read operation of the next data is performed by the LD instruction (STEP 907), and interpolation data of the arithmetic operation result of FIG. 14 is written by the ST instruction into the data memory 107 (STEP 908). Then, the JMP instruction is executed to perform an intra-field interpolation process (STEP 909), after which the program returns to STEP 903.

If an image without movement is detected, a comparison in size between an inter-frame aliasing distortion component and an inter-field aliasing distortion component is made by the COexe4 instruction (STEP 910 of FIG. 17). Making use of the result of this compare operation, branch control is exerted by the BL instruction (STEP 911). In other words, if the inter-field aliasing distortion component is greater than the inter-frame aliasing distortion component, the program proceeds to STEP 912, otherwise to STEP 915.

If inter-field aliasing distortion is greater than inter-frame aliasing distortion, then the next data is input by execution of the LD instruction at a delay slot (STEP 912). Thereafter, data less inter-field aliasing distortion is written into the data memory 107 by the ST instruction (STEP 913). Then, the JMP instruction is executed to perform an intra-field interpolation process (STEP 914), after which the program returns to STEP 903.

If inter-frame aliasing distortion is greater than inter-field aliasing distortion, the next data is input by execution of the LD instruction (STEP 915). Thereafter, data less inter-frame aliasing distortion is written into the data memory 107 by the ST instruction (STEP 916). Then, the JMP instruction is executed to perform an intra-field interpolation process (STEP 917), after which the program returns to STEP 903.

By repeating the above-described operations, high-speed MUSE image processing can be accomplished.

In this embodiment, the transfer of instructions and the transfer of data are performed through a single system bus, namely the system bus 119. The processor 100 may contain two ports to make two different buslines available. Of these two buslines one is used for the transfer of instructions and data from the program memory 122 to the CPU 105 and the other is used for the DMA transfer of data between the frame memories 116, 117 and the data memory 107. This enables high-speed control without causing mutual interference. Further, the DMA controller 113 may be eliminated, in which case the transfer of data between the frame memories 116, 117 and the data memory 107 is directly dealt with by the CPU 105. Furthermore, instead of employing the frame memories 116 and 117, line memories or FIFO memories may be useful.

A ghost canceler or a waveform equalizer may be provided between one of the sync circuits 114 and 115 and the output-side frame memory 116. Additionally, a filter processing circuit may be provided between the processor 100 and the output-side frame memory 117.

In the present embodiment, the Y separation and the C separation are performed by a single processor (i.e., the processor 100). A plurality of processors may be employed to perform the both in parallel. The above-described NTSC Y/C separation procedure finds applications in such TV broadcasting systems as EDTV and EDTV II requiring the Y/C separation. PAL (Phase Alternation Line) video signals may be processed by changing the program and switching the sum-of-products factor.

The present invention finds application not only in TV receivers but also in video signal processors including VTR's. The PSAS 101 may be used as a filter for audio signal processing. By changing factor-setting to the SFRS 104, a variable-characteristic audio filter can be realized. Additionally, application of digital signals from digital TV's, VTR's, or CD-ROM's to the system bus 119 enables multi-media processing thereof, as in the above-described video signal processing. Further, instead of using the adders 261–275 of the PSAS 101 of a tree structure, different types of adders such as adders of a ripple carry type may be useful. In this embodiment, the input registers 201–216 and the factor registers 241–256 are of an 8-bit configuration and a 4-bit configuration respectively, which, however, is not to considered restrictive. Other bit configurations may be used for these registers.

Embodiment 2

Figure 19:
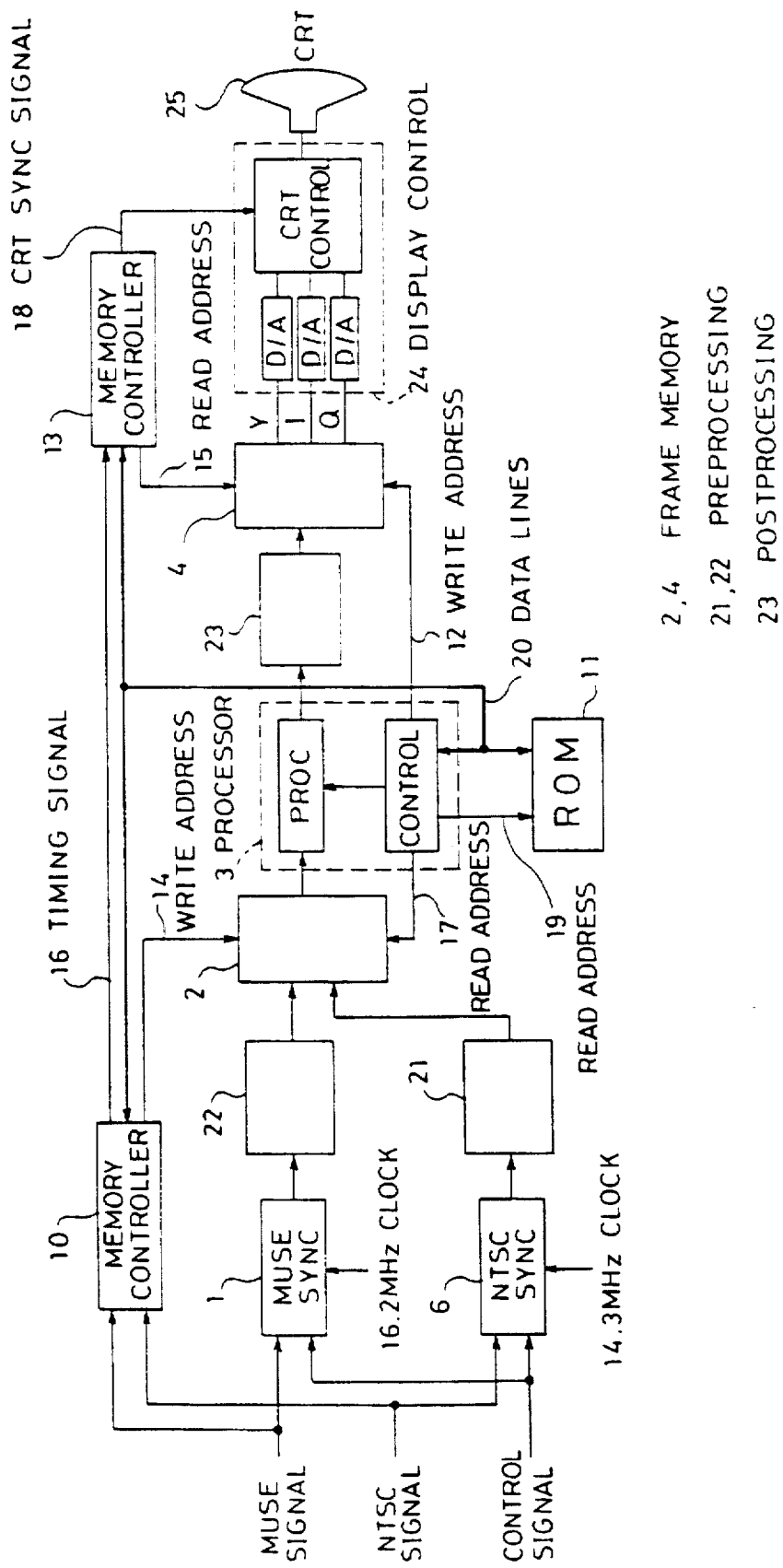
FIG. 19 is a block diagram of a second TV receiver of the present invention.

Referring now to FIG. 19, the organization of a second TV receiver of the present invention is described. Note that the NTSC signal includes such signals as EDTV signals and EDTV II signals that are subject to a Y/C separation process. FIG. 19 shows a MUSE sync circuit 1, an input-side frame memory 2 with three ports provided on it, a processor 3 of a stored program type, an output-side frame memory 4 with two ports provided on it, an NTSC sync circuit 6, an input-side memory controller 10, a ROM 11 for storing a program for the processor 3, a data line 20, an NTSC pre-processing unit 21, a MUSE pre-processing unit 22, a post-processing unit 23, a display control section 24 that receives the CRT SYNC SIGNAL 18, and a CRT 25. FIG. 19 further shows a WRITE ADDRESS 12 that is applied from the processor 3 to the output-side frame memory 4, an output-side memory controller 13, a WRITE ADDRESS 14 that is applied from the memory controller 10 to the input-side frame memory 2, a READ ADDRESS 15 that is applied from the memory controller 13 to the output-side frame memory 4, a TIMING SIGNAL 16 that is applied from the input-side memory controller 10 to the output-side memory controller 13, a READ ADDRESS 17 that is applied from the processor 3 to the input-side frame memory 2, a CRT SYNC SIGNAL 18 that is provided from the output-side memory controller 13, and a READ ADDRESS 19 that is applied from the processor 3 to the ROM 11. External signals (i.e., MUSE and NTSC signals) that are input from the outside contain synchronizing signals and video signals. The synchronizing signal is divided into two, that is, one is a horizontal synchronizing signal and the other is a vertical synchronizing signal. Whereas the horizontal synchronizing signal is inserted for every one scanning line, the vertical synchronizing signal is inserted for every one field. In usual TV receivers, it is required that received broadcasting signals are synchronized by means of a tuner to extract signals of a channel selected. Such an operation is done by the MUSE sync circuit 1 and the NTSC sync circuit 6 in this embodiment, and the selecting of a particular channel is performed by an external control signal.

The MUSE signal is applied to the input-side memory controller 10 as well as to the MUSE sync circuit 1. On the other hand, the NTSC signal is applied to the input-side memory controller 10 as well as to the NTSC sync circuit 6. The MUSE sync circuit 1 gives an output to the MUSE pre-processing unit 22 through which the circuit's 1 output is connected to the input-side frame memory 2. Meanwhile, the output of the NTSC sync circuit 6 is connected to the input-side frame memory 2 through the NTSC pre-processing unit 21. The MUSE pre-processing unit 22 is formed by a waveform equalizer or a de-emphasis filter. The NTSC pre-processing unit 21 is formed by a ghost canceler.

Both the MUSE pre-processing unit 22 and the NTSC pre-processing unit 21 work to improve image quality. The input-side frame memory 2 is connected with the processor 3. The processor 3 is connected to the ROM 11, the input-side memory controller 10, and the output-side memory controller 13 via the data line 20. The output of the processor 3 is connected to the output-side frame memory 4 via the post-processing unit 23 that may be formed by a vertical filter. The output of the output-side frame memory 4 is applied to the display control section 24 that is connected with the CRT 25.

A MUSE signal applied from the outside is sampled by the MUSE sync circuit 1 at a sampling rate of 16.2 MHz and the result of the sampling operation is stored in the input-side frame memory 2 via the MUSE pre-processing unit 22. An NTSC signal applied from the outside is sampled by the NTSC sync circuit 6 at a sampling rate of 14.3 MHz and the result of the sampling operation is stored in the input-side frame memory 2 via the NTSC pre-processing unit 21. Pixel data of the MUSE signal and pixel data of the NTSC signal are written in respective zones of the input-side frame memory 2, and the MUSE pixel or the NTSC pixel is selected at data readout time.

The MUSE and NTSC signals are also received by the input-side memory controller 10. The input-side memory controller 10 makes a search for a synchronizing signal. Upon detecting a horizontal synchronizing signal, the input-side memory controller 10 sets the WRITE ADDRESS 14 of the input-side frame memory 2. This processing is described by reference to FIG. 20.

FIG. 20 is an address mapping example of the input-side frame memory 2. From $a_0$ to $a_{3ff}$ are pixel storage zones for one scanning line. From 0 to $3ff$ are given in hexadecimal and can be represented within the 10-bit range. In this example, if a horizontal synchronizing signal is input, then the last ten bits of the WRITE ADDRESS 14 of the frame memory 2 are set to 0's while the remaining bits are subjected to an increment process.

For example, for the case of the NTSC signal, the horizontal sampling count totals to 910 samples at a sampling rate of 14.3 MHz. This is equivalent to $0-38d$ in the hexadecimal number system. Therefore, if the write operation is performed while performing a pixel-by-pixel address increment operation after the low- and high-order addresses have been set to 0's, 910 data items for one scanning line are stored in from $a_0$ to $a_{38d}$. If a horizontal synchronizing signal is input, this sets the last ten bits of the WRITE ADDRESS 14 to 0's and the remaining bits are subjected to an increment process. As a result, the next scanning line is stored in from $b_0$ to $b_{38d}$. Repetition of such a process permits the last ten bits of the memory address to identify locations of pixels for one scanning line and further permits the remaining bits to indicate a scanning line number.

If the pixel data have been written in the input-side frame memory 2 in the above-described manner, this allows the processor 3 to automatically recognize an address in which the last ten bits of the READ ADDRESS 17 are zeros as the data head of pixel data for one scanning line, without inputting a synchronizing signal contained in an input video signal. In usual video processing, synchronization is accomplished using a system clock signal whose frequency is the same as the input signal sampling rate and which is phase-locked to such an input signal. Conversely, in the present invention high-speed performance can be realized asynchronously by taking full advantage of the processor's features. Additionally, any number of pixels can be read from any address of the input-side frame memory 2 for video processing. For example, any part of pixel data for one scanning line (e.g., from $a_5$ to $a_{100}$) can be extracted and processed. This facilitates the aspect ratio conversion or the frame enlargement.

Figure 21:
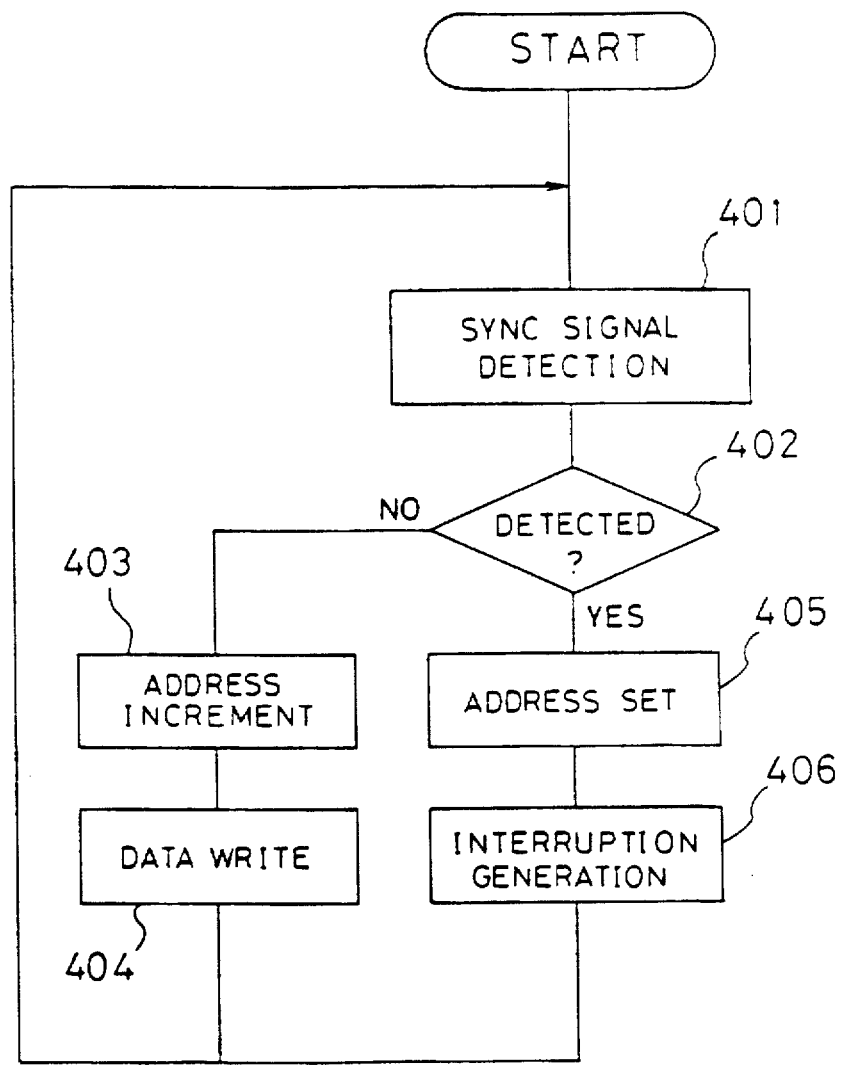
FIG. 21 is an operation flowchart of the input-side frame memory controller of FIG. 19.

FIG. 21 is a rough operation flow chart of the input-side memory controller 10. At STEP 401, the input-side memory controller 10 makes a search for a horizontal synchronizing signal. At STEP 402, the result thereof is identified. If a horizontal synchronizing signal is detected, then the last ten bits of the WRITE ADDRESS 14 of the frame memory 2 are set to 0's whereas the remaining bits are incremented at STEP 405. An interruption is made to occur so as to notify the processor 3 of the fact that the storage of one scanning line has been completed (STEP 406). Since the processor 3 is faster than the input-side frame memory 2, the processor 3 may make a jump over already-input pixels to conduct its processing unless such an interruption takes place. The interruption signal conducts to the processor 3 over the data line 20. In receipt of the interruption signal, the processor 3 deals with 910 pixels for one scanning line, and then goes into the wait state. During the period that no horizontal synchronizing signals have been detected, the low-order addresses of the WRITE ADDRESS 14 are incremented (STEP 403) while at the same time pixel data is sequentially written in the input-side frame memory 2 (STEP 404). The read operation from the output-side frame memory 4 by the output-side memory controller 13 is the same as the one as shown in FIG. 21, with the exception that it is performed based on the TIMING SIGNAL 16 from the input-side memory controller 10. Instead of an interruption step (i.e., STEP 406), a flag may be set to send interruption information to the processor 3.

The processor 3 controls the input-side memory controller 10 and the output-side memory controller 13 via the data line 20. If a synchronizing signal for the synchronizing of the memory controller 10 and the output-side memory controller 13 is detected, the setting of address is made by making use of the contents of an address setting register predefined by the processor 3. Additionally, the processor 3 inputs one-scanning-line pixel data from the input-side frame memory 2, thereby conducting respective processing depending on the broadcasting system. A signal processing section is incorporated into the processor 3, which is composed of components such as a horizontal filter, a vertical filer, and a comparator for video processing. A bus switch is employed to change the connection of the horizontal filter, the vertical filer, and the comparator. These components are controlled by a control section that operates by a program of the ROM 11 so as to conduct the MUSE/NTSC signal processing. The result of the processing performed by the processor 3 is delivered to the output-side frame memory 4 by the same mapping as the one shown by FIG. 20.

The output-side memory controller 13, in response to the TIMING SIGNAL 16 from the input-side memory controller 10, outputs the READ ADDRESS 15 for reading pixel data from the output-side frame memory 4. In other words, upon receipt of the TIMING SIGNAL 16, the output-side memory controller 13, like the input-side memory controller 10, sets the last ten bits of the READ ADDRESS 15 to 0's. The pixel data read out of the output-side frame memory 4 is sent to the display control section 24. The output-side memory controller 13 applies to the display control section 24 the CRT SYNC SIGNAL, 18 for horizontal/vertical synchronization at the CRT 25. As a result, the relationship of the pixel data fed to the CRT 25 versus the CRT SYNC SIGNAL 18 is kept in an adequate state.

Figure 22:
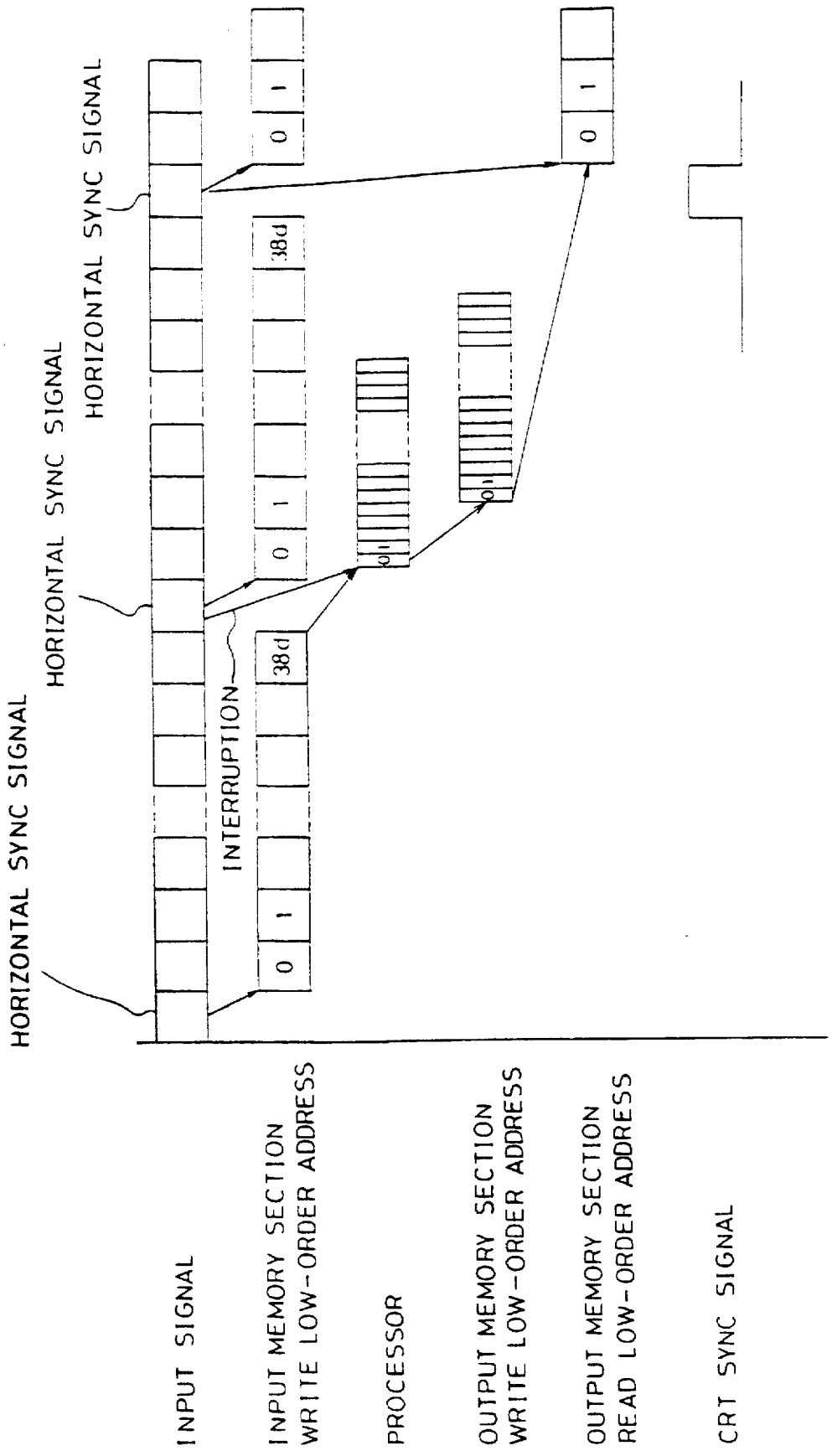
FIG. 22 is an operation timing diagram of the second TV receiver.

FIG. 22 is a timing diagram summarizing the operation of the second TV receiver of the invention. The input video signal contains a synchronizing signal, and if a vertical synchronizing signal is detected, then the low-order addresses of the WRITE ADDRESS 14 of the frame memory 2 are set to 0's. Thereafter, by this operation, the write operation into the frame memory 2 is carried out by means of pixel-by-pixel address increment. The input-side frame memory 2 will have finished storing pixel data for one scanning line when the next horizontal synchronizing signal is received. This storage completion is reported by means of interruption to the processor 3. The processor 3 conducts processing by such interruption. In an example as shown in FIG. 22, the processor 3 operates by a system clock signal whose frequency is 60 MHz that is about four times the NTSC sampling rate (i.e., 14.3 MHz). The processing result is written into the output-side frame memory 4. The read operation out of the output-side frame memory 4 is performed at the same frequency that the write operation to the input-side frame memory 2 is performed. By setting the low-order addresses to 0's by an extracted synchronizing signal and outputting the CRT SYNC SIGNAL 18 to the display control section 24, synchronization is maintained.

The present embodiment is characterized in that the write operation to the input-side frame memory 2 by the input-side memory controller 10 and the read operation by the processor 3 can be asynchronously performed and that the write operation to the output-side frame memory 4 from the processor 3 and the read operation by the output-side memory controller 13 can be asynchronously performed. The TIMING SIGNAL 16 to the output-side memory controller 13 is exclusively used for generating output timing of pixel data to the CRT 25. Internal generation of the CRT SYNC SIGNAL 18 may cause malfunctions because of frequency deviation from the broadcasting station. The TIMING SIGNAL 16 is used to correct such deviation. If it is possible to generate a correct CRT SYNC SIGNAL 18, this eliminates the need for generating the TIMING SIGNAL 16. If the frequency of a system clock signal being applied to the processor 3 is made to triple at the time of receiving the MUSE signal (i.e., 16.2 MHz) and the NTSC signal (i.e., 14.3 MHz), then it becomes unnecessary to apply the TIMIING SIGNAL 16 from the input-side memory controller 10 to the output-side memory controller 13. It is possible to change the system clock signal's frequency to 48.6 MHz when receiving the MUSE signal, or to 42.9 MHz when receiving the NTSC signal. The same can be applied to such a case where the processor 3 conducts video signal processing at the common multiple frequencies.

Figure 23:
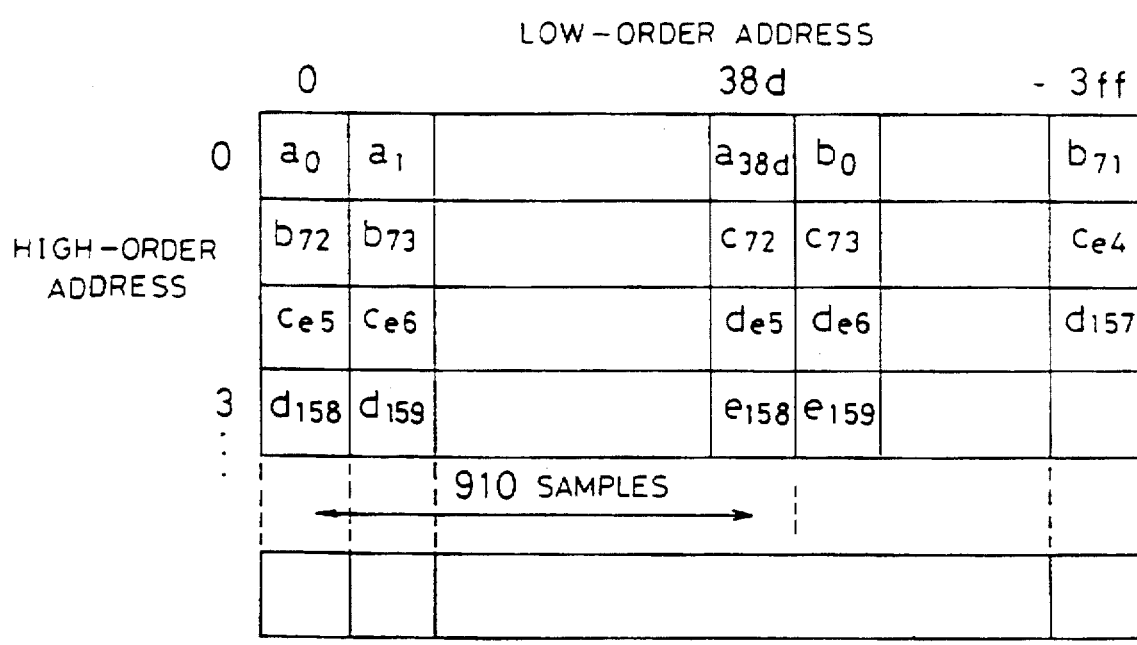
FIG. 23 is a modification of the address mapping diagram of the input-side frame memory of FIG. 20.

FIG. 23 is a modification of the mapping of the input-side frame memory 2. For the case of the mapping of FIG. 20 for the NTSC signal, some regions of memory (i.e., from the low-order address 38d (hexadecimal) onward) remain unused because the number of samples is only 910 per scanning line. Conversely, the mapping of FIG. 23 allows memory to store pixels in sequence, thereby providing an improved method capable of effectively using memory regions. If a vertical synchronizing signal is detected, however, the low-order addresses are initialized to 0's. If the number of samples in the horizontal direction is fixed, and if address addition by a number of samples for one scanning line is performed at the read operation, then locations of pixels can be identified by address. This method permits the processor 3 to identify one-scanning-line pixel data by address alone and process it, and allows video processing to be out of synchronism with sampling processing. Setting the low-order addresses to 0's by the vertical synchronizing signal may be performed at intervals of several fields. Additionally, if the amount of memory is an integral multiple of the number of samples for one scanning line, then pixel locations can be determined by the horizontal synchronizing signal alone.

In the present embodiment, it is the input-side memory controller 10 that makes a search for a synchronizing signal; however, it is possible to assign this detection task to an external device that delivers the result of the detection operation to both the input-side memory controller 10 and the output-side controller 13. The following structure may be useful. In this structure, the result of the synchronizing signal detection at the MUSE sync circuit 1 and the NTSC sync circuit 6 is shared between each memory controller. If the input-side memory controller 10 or the output-side memory controller 13 is made to be controlled by the processor 3, this makes it possible to access control registers of the memory controllers 10 and 13 as a part of memory of the processor 3. In the present embodiment, the low-order addresses are set by an input synchronizing signal to zeros; however, they may be set to different values. Further, the lower-order addresses (ten bits) are set. A different number of bits may be useful. For example, if only the MUSE signal is considered, 9 bits are enough because the number of samples per scanning line is 480. One-scanning-line pixel data can be separate-stored in plural regions of memory as long as pixel locations can be identified by means of address. This can be realized by first setting the high-order addresses and then incrementing the low-order addresses, and also can be realized by means of address decrement or by address increment/decrement of an address with a distance of 2 or more. Likewise, field locations can be identified by setting the low-order bits of the high-order addresses to zeros when the vertical synchronizing signal is detected.

In the present embodiment the processor 3 conducts processing for every one scanning line. The processor 3, however, may conduct processing for every several scanning lines or for every several fields. The functions of the pre-processing units 21 and 22 and the post-processing unit 23 may be performed by the processor 3. Even if video processing by the stored program method, which is performed by the processor 3 in this embodiment, is performed by dedicated hardware, it is possible to increase the processing speed above the sampling rate. In this embodiment, MUSE and NTSC are assigned respective zones of the input-side frame memory 2 for address storage, and the change between them is made by read address from the input-side frame memory 2. Alternatively, a selector may be provided between the pre-processing unit 21, 22 and the input-side frame memory 2, thereby selecting between MUSE pixel and NTSC pixel so as to provide a selected pixel to the input-side frame memory 2. In the present invention, the output is displayed on the CRT 25. The output may be connected to and stored in other video image processors and media.

Various digital filter techniques are known. For example, a paper, entitled "Consideration about a Chrominance Signal Processing for MUSE System" by Seiichi Gohshi et al (ITEJ Technical Report, vol. 16, No. 32, pp 13–18, ICS '92–40 (June, 1992), discloses a digital filter technique for use in TV receivers having a structure of feeding the output of a single horizontal filter section to a single vertical filter section. A line memory for three scanning lines is provided between the horizontal filter section and the vertical filter section. 3-line pixel data is output from the horizontal filter section. It is possible to activate the vertical filter section when the line memory is filled with such pixel data. Conversely, if a particular structure is used in which 3-line data items read at the same time from a frame memory are allocated among three horizontal filter sections, and if outputs of these three horizontal filter sections are fed to a single vertical filter section, this reduces line memory. The organization of a processor with flexibility suitable for the latter is shown in FIG. 26.

Figure 26:
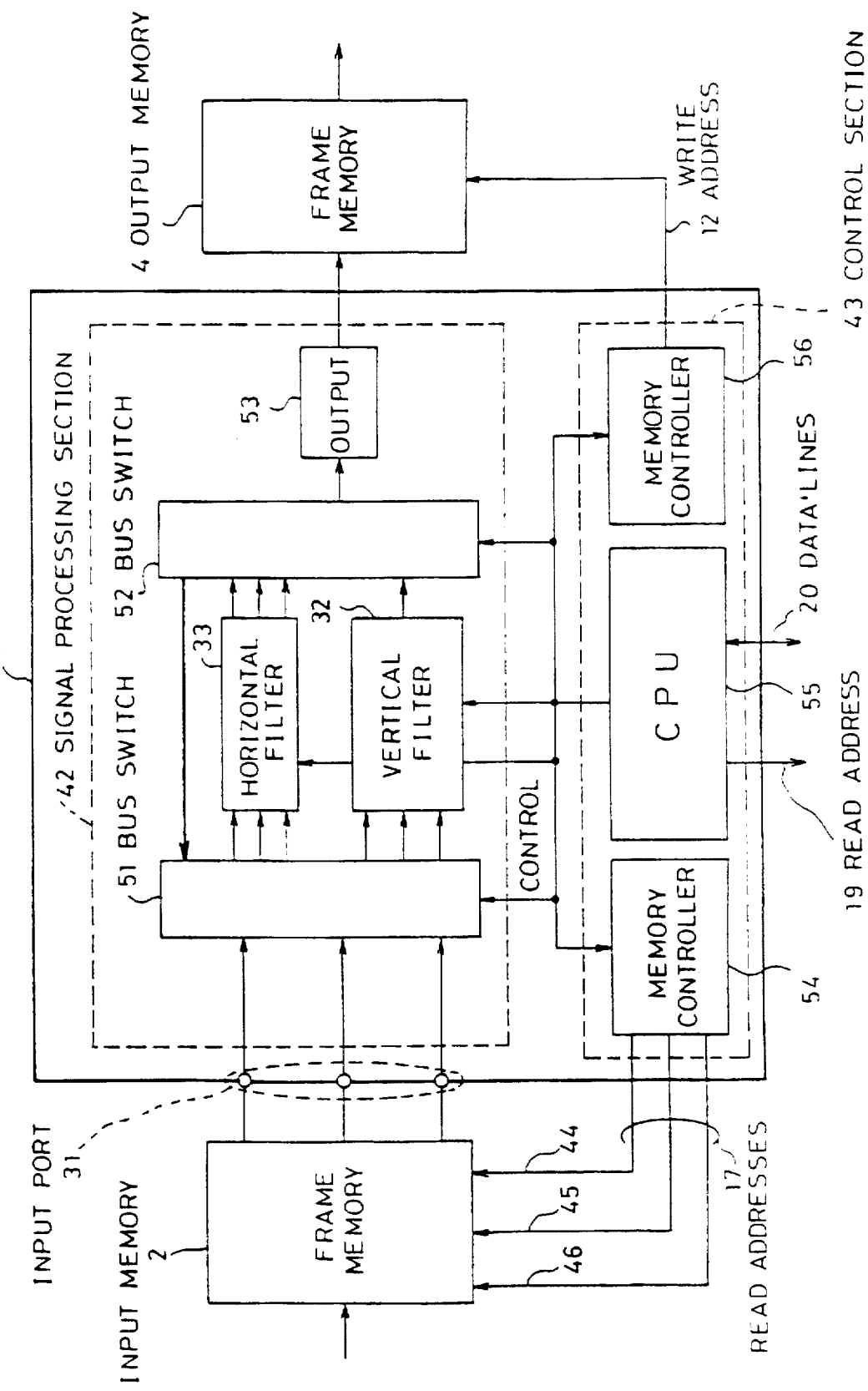
FIG. 26 is an internal structure block diagram of a processor of FIG. 19.

FIG. 26 shows an internal organization of the processor 3 of FIG. 19 and its connection to the outside. The post-processing unit 23 of FIG. 19 is not shown in FIG. 26.

FIG. 26 shows an input port 31 having three inputs at which data is input from an input memory section 2 formed by a frame memory, a vertical filter section 32, a horizontal filter section 33, input- and output-side bus switches 51 and 52 for changing the connection of the vertical filter section 32 and the connection of the horizontal filter section 33, and an output section 53. The processor 3 has a signal processing section 42 formed by the vertical filter section 32, the horizontal filter section 33, the bus switch 51, and the bus switch 52, and the output section 53. Reference numeral 54 is an input-side memory controller for processing. Reference numeral 55 is a central processing unit (CPU). Reference numeral 56 is an output-side memory controller for processing. The processor 3 has a control section 43 formed by the CPU 55 and the memory controllers 54 and 56.

The input port 31 of the processor 3 is connected to the input memory section 2. The input-side bus switch 51 is so designed that it can receive data from the input port 31 as well as from the output-side bus switch 52. Both the vertical filter section 32 and the horizontal filter section 33 filter data received from the input-side bus switch 51, and the results of the filter operations are output to the output-side bus switch 52. The output-side bus switch 52 not only feeds the received data back to the input-side bus switch 51 but also provides the output section 53 with the final processing result. The output of the output section 53 is written in an output memory section 4 formed by a frame memory.

Whereas the supply of the READ ADDRESS 17 to the input memory section 2 is controlled by the memory controller 54, the supply of the WRITE ADDRESS 12 to the output memory section 4 is controlled by the memory controller 56. The READ ADDRESS 17 is composed of three addresses 44, 45, and 46 so that pixel data for three scanning lines can be read at the same time from the input memory section 2. The CPU 55 is connected to the ROM 11 of FIG. 19 that is provided outside the processor 3, to the vertical filter section 32, to the horizontal filter section 33, to the bus switches 51 and 52, and to the memory controllers 54 and 56 for the controlling of each block.

Figure 28:
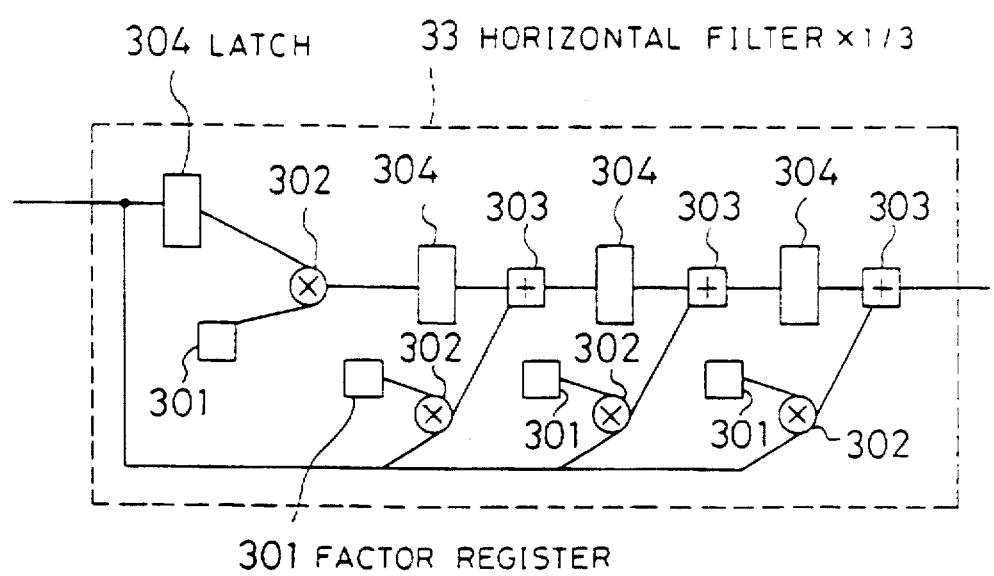
FIG. 28 is a partial circuit diagram of a horizontal filter section of FIG. 26.

As shown in FIG. 27, the vertical filter section 32 is formed by factor registers 301, multipliers 302, and an adder 303. The horizontal filter section 33, as shown in FIG. 28 that shows only one third of the section 33, is formed by factor registers 301, multipliers 302, and adders 303, and latches 304. The provision of the factor register 301 allows both the filter sections 32 and 33 to change their filter characteristics. Particularly, the vertical filter section 32 is provided with two sets of factor registers so as to accomplish high-speed factor change performance. If pixel data for plural lines is fed to the vertical filter section 32, this accomplishes inter-line processing. On the other hand, if pixel data for plural fields is fed to the vertical filter section 32, this accomplishes inter-field processing (i.e., time filter processing). It is feasible for making the vertical filter section 32 perform arithmetic operations between any pixel data items. Additionally, the horizontal filter section 33 may have plural sets of factor registers.

If the bus switches 51 and 52 are set such a way that (i) pixel data for three lines, fetched in from the input memory section 2 through the input port 31, is applied to the horizontal filter section 33, (ii) the horizontal filter section 33 then outputs to the vertical filter section 32, and (iii) the output of the vertical filer section 32 is fed to the output section 53, this reduces the foregoing line memory, thereby realizing a digital filter with less hardware.

Figure 29:
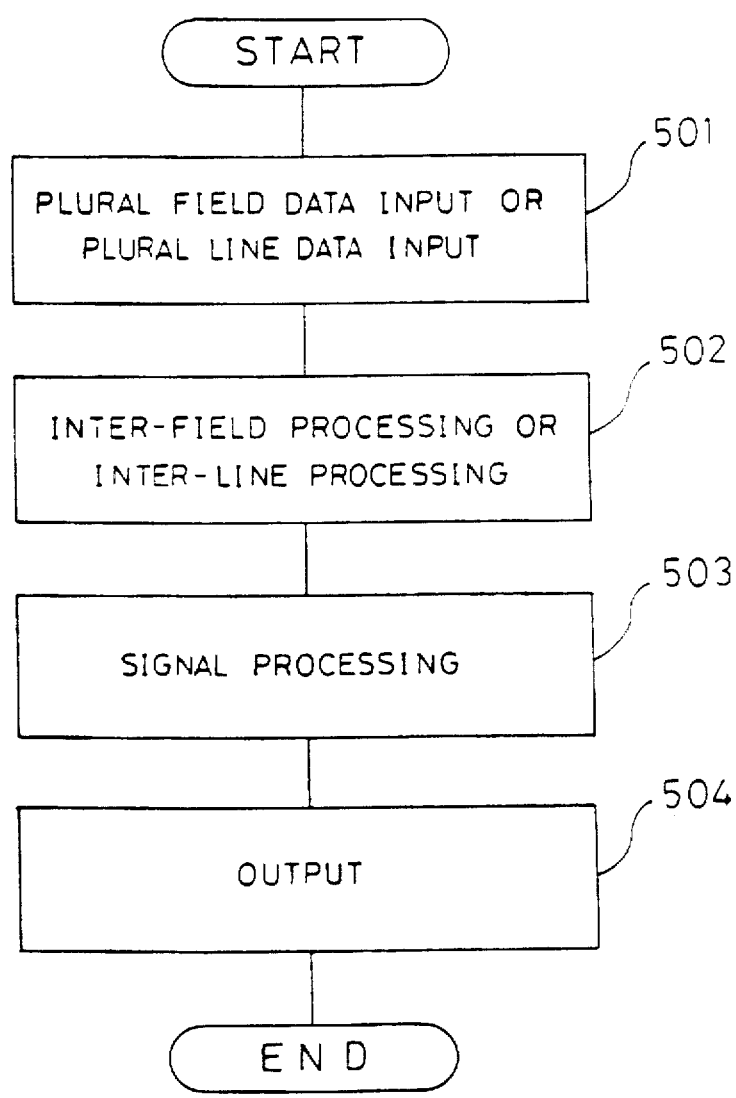
FIG. 29 is a flowchart showing the contents of processing performed by the processor of FIG. 26.

Referring now to the flowchart of FIG. 29, other operations of the processor 3 are described. Prior to execution of the program of FIG. 29, the CPU 55 runs another program to set the factor registers 301, 301 within the vertical filter section 32 and the horizontal filter section 33. In addition, the bus switches 51 and 52 are preset by means of program control in order that data, fetched in through the input port 31, is delivered to the vertical filter section 32, that the vertical filter section 32 gives its output to the horizontal filter section 33, and that the horizontal filter section 33 outputs to the output section 53.

At STEP 501, the input-side memory controller 54 is set by the CPU 55 for inputting data for plural fields or plural lines and data items specified by the READ ADDRESSES 44, 45, and 46 are read from the input memory section 2, thereafter these data items being applied to the input port 31. Then, the data items are fed to the vertical filter section 32 through the input-side bus switch 51. At STEP 502, the vertical filter section 32 conducts inter-filed processing or inter-line processing. AT STEP 503, the horizontal filter section 33 that has received an output of the vertical filter section 32 performs further signal processing. At STEP 504, the output of the horizontal filter section 33 is written into the output memory section 4 through the output section 53. It is possible to realize a digital filter capable of first performing a vertical filter operation to unify 3-line pixel data to 1-line pixel data and then conducting a horizontal filter operation.

Figure 30:
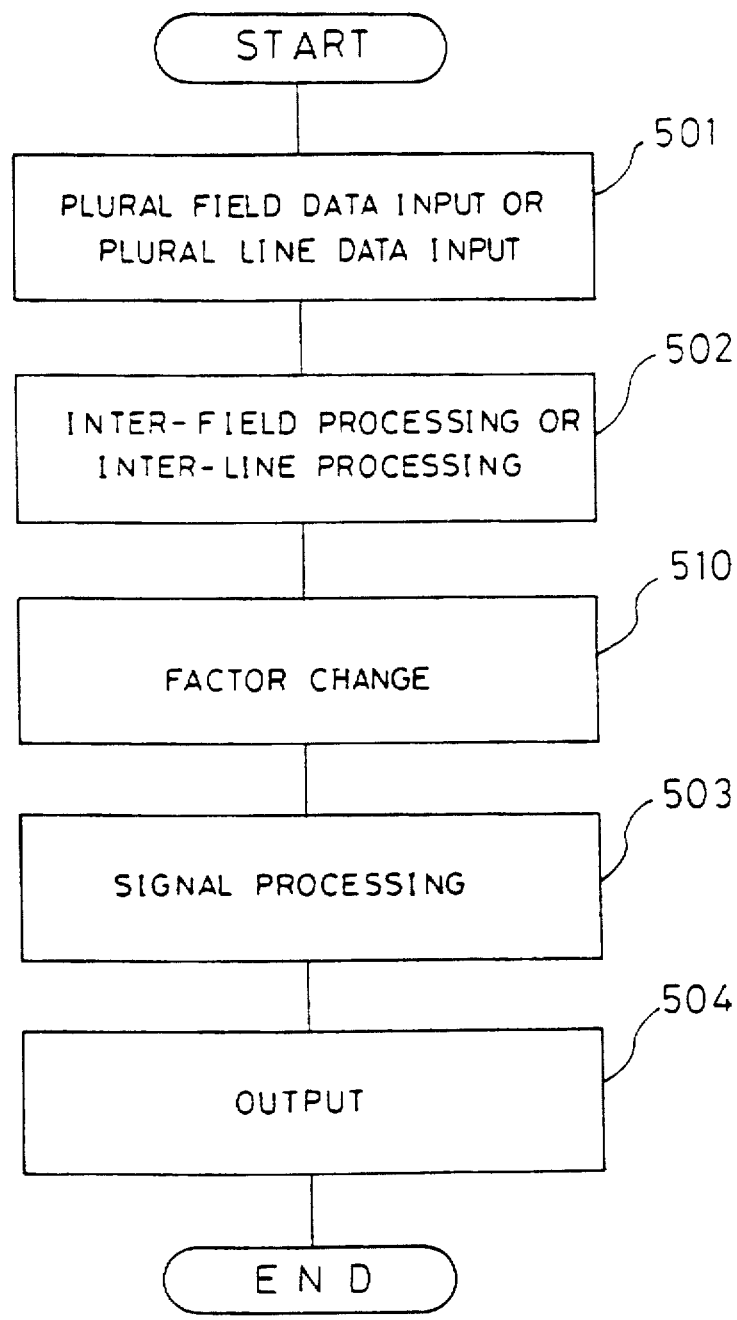
FIG. 30 is a modification of FIG. 29.

FIG. 30 shows an algorithm that further includes a factor change step (STEP 510). In this algorithm the factor is subject to change for iterative use of the same hardware. For example, it is possible for the horizontal filter section 33 to be used as a 4 MHz low pass filter and then as an 8 MHz low pass filter by changing the factor. Any factor change timing may be used. For example, such a change may be made after plural line-by-line processes have been completed.

The vertical filter section 33 may be replaced by a block for comparing input data items. Since vertical filter processing and horizontal filter processing are realized by performing sum-of-products arithmetic operations, the vertical filter section 32 and the horizontal filter section 33 may be formed by sum-of-products arithmetic means having the same hardware configuration. If the output of a single sum-of-products arithmetic means is fed back to itself in order to repeatedly perform sum-of-products arithmetic operations, this makes it possible to integrate the vertical filter section 32 and the horizontal filter section 33 into a single sum-of-products arithmetic means. This, therefore, reduces the amount of hardware to a further extent. Additionally, it is possible to share the input memory section 2 among plural processors.

Embodiment 3

Figure 24:
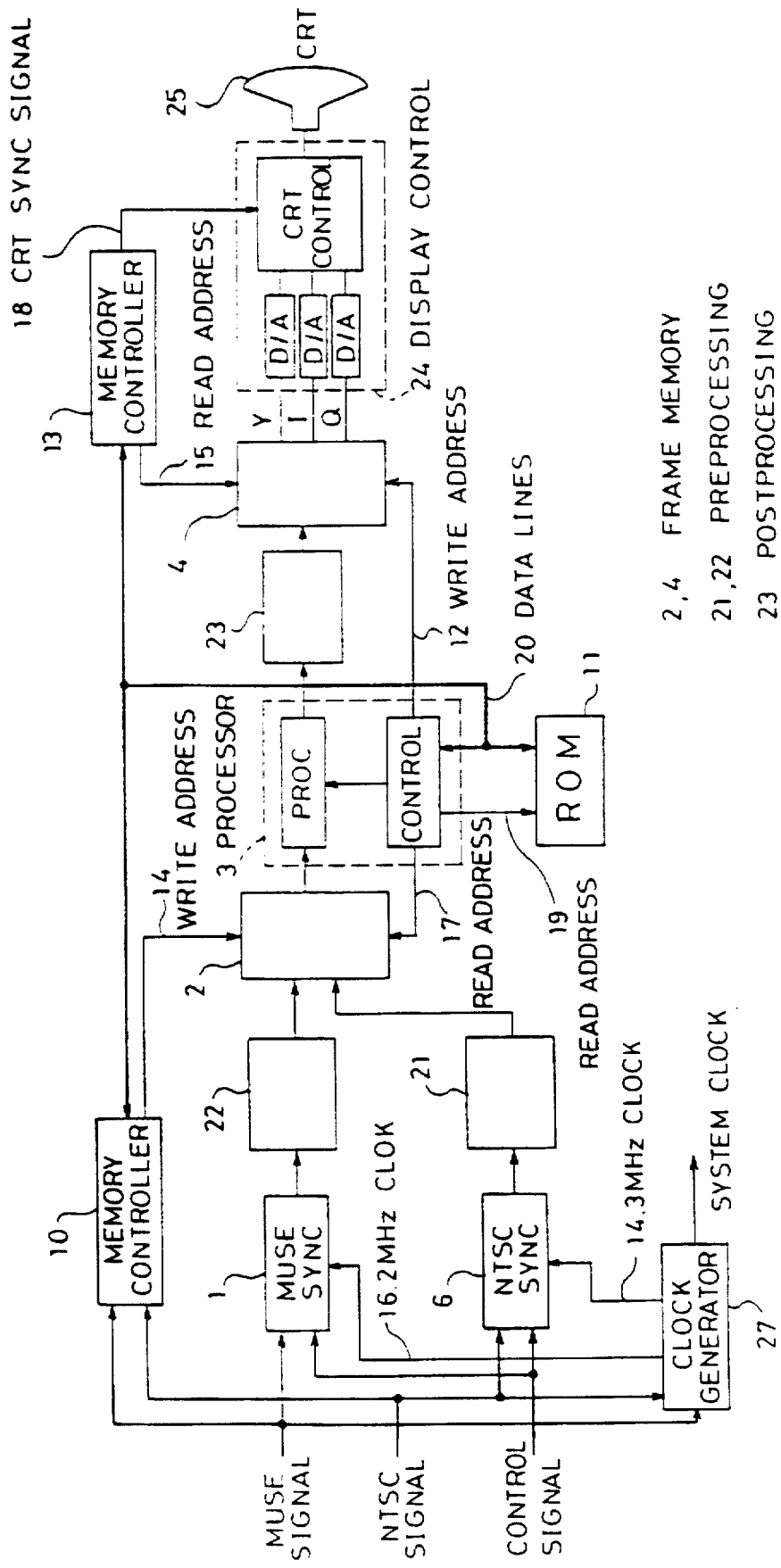
FIG. 24 is a block diagram of a third TV receiver of the present invention.

Referring now to FIG. 24, a third TV receiver of the present invention is described. The third TV receiver of FIG. 24 and the second TV receiver of FIG. 19 are similar in configuration except that the former has no control line for the transfer of the TIMING SIGNAL 16 between the input-side memory controller 10 and the output-side memory controller 13 but a clock generator 27.

The clock generator 27 receives a MUSE signal and an NTSC signal, detects a synchronizing signal so as to generate a clock signal in phase with such a detected synchronizing signal, and outputs the generated clock signal to the MUSE sync circuit 1 as well as to the NTSC synch circuit 6 as a sampling clock signal. The clock generator 27 also generates a system clock signal for operating the processor 3. Such a system clock signal phase-locks to the synchronizing signal. The system clock signal's frequency is set to be an integral multiple of the frequency of the clock signal of the MUSE sync circuit 1 or the NTSC sync circuit 6. This permits the processor 3 to asynchronously conduct processing faster than the sampling rate. If pixel data input timing is set at the beginning, this eliminates the need for making a report that one-scanning-line pixel data has been input by interruption because the processor 3 can identify the pixel input status with the aide of an address counter.

The frequency of the system clock signal may be made to triple so that it is 48.2 MHz (when receiving the MUSE signal) or 42.9 MHz (when receiving the NTSC signal). A particular frequency, which is a common multiple of them, may be used for processing.

Embodiment 4

Figure 25:
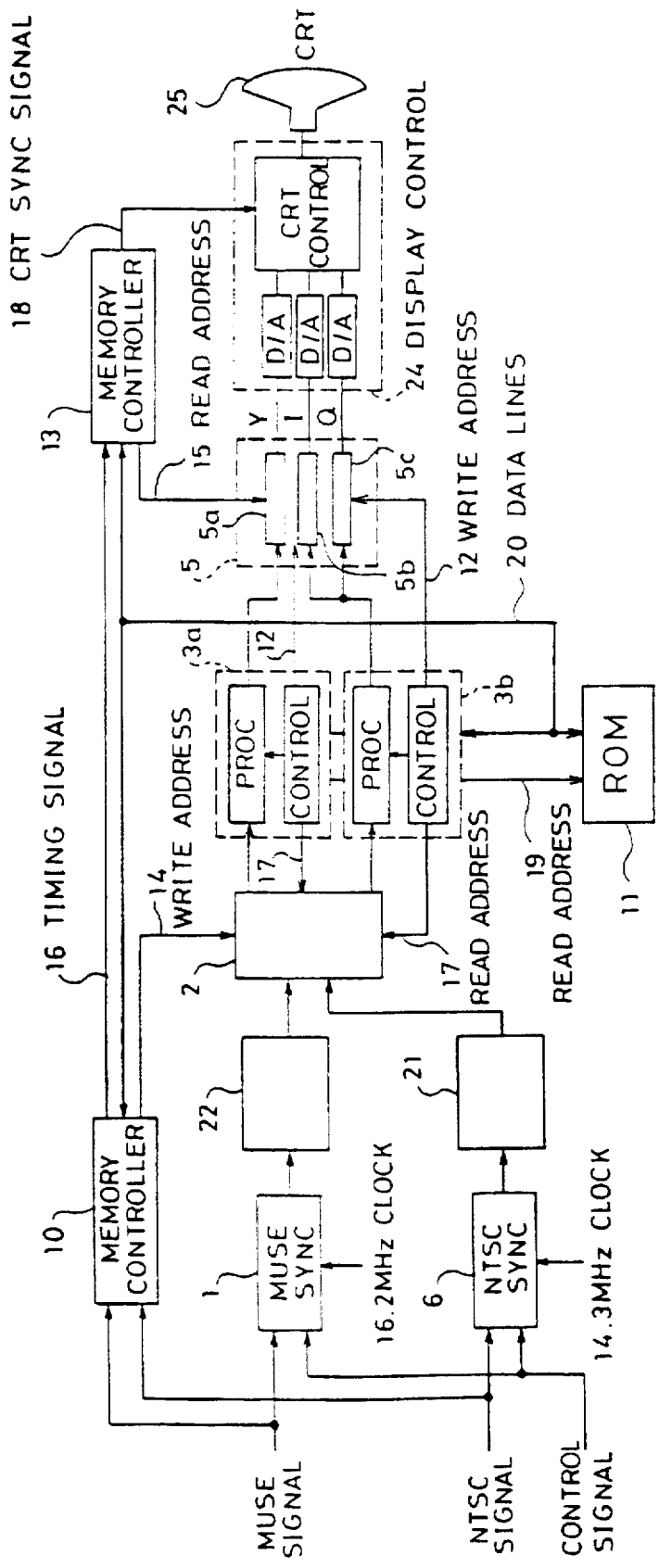
FIG. 25 is a block diagram of a fourth TV receiver of the present invention.

FIG. 25 shows a fourth TV receiver in accordance with the present invention. The fourth TV receiver is characterized in that it employs two processors 3a and 3b and that the output memory section 5 is formed by three line-memories 5a, 5b, and 5c. Image display on the CRT 25 simultaneously requires a chrominance signal and a luminance signal. However, in accordance with the organization of FIG. 19, these signals are processed on a time-sharing basis. Therefore, one of these signals must be held in order that both of these signals are simultaneously output when outputting pixel data to the display control section 24. For this reason, a field memory or a frame memory is required. Conversely, in the present embodiment, the provision of two processors, namely the processors 3a and 3b enable simultaneous processing of chrominance and luminance signals. This not only eliminates the need for holding one of these signals but also makes it possible to use the line-memories 5a, 5b, and 5c that are small in memory size, and the output-side frame memory 4 of FIG. 19 that is expensive becomes unnecessary. In the present invention, the two processors 3a and 3b are used. Three or more processors may be used.

In the second to fourth embodiments, it is possible to form the input-side memory controller 10 and the output-side memory controller 13 by a single memory controller block. In the third and fourth embodiments, it is possible to use a processor having the internal organization shown by FIG. 26.

The invention claimed is:

1. A signal processor comprising:
   (a) first and second storage means for storing plural items of pixel data,
   (b) first control means for writing the pixel data obtained by sampling an input signal including at least one video signal into said first storage means, a write location of said first storage means being determined in accordance with a first signal,
   (c) second control means for reading the pixel data from said second storage means, a read location of said second storage means being determined in accordance with a second signal, and
   (d) processing means for processing said pixel data read from said first storage means at an operating frequency higher than a sampling rate of said input signal.

2. A signal processor as in claim 1, wherein said first control means has an address generation circuit that generates said first signal indicative of a write address of said first storage means.

3. A signal processor as in claim 1, wherein said second control means has an address generation circuit that generates said second signal indicative of a read address of said second storage means.

4. A signal processor as in claim 1, wherein said first control means has functions of detecting a synchronizing signal in said input signal and feeding to said second control means a timing signal for setting said second signal every time said synchronizing signal is detected.

5. A signal processor as in claim 1, wherein said first control means is capable of:
   (a) detecting a synchronizing signal in said input signal, and
   (b) increasing said first storage means' write location by an integer in order that pixel data for at least one scanning line is sequentially written in said first storage means as long as said synchronizing signal is not detected, or setting said write location if said synchronizing signal is detected, and activating said processing means, and
   wherein said second control means is capable of increasing said second storage means' read location by an integer in order that pixel data for at least one scanning line is sequentially read out of said second storage means as long as said synchronizing signal is not detected, or setting said read location if said synchronizing signal is detected.

6. A signal processor as in claim 1, further including, a clock generator for generating an operating clock signal of said processing means from said input signal in order that said processing means can perform read and processing operations of said pixel data in synchronism with said input signal at an operating frequency that is an integral multiple of said sampling rate.

7. A signal processor as in claim 1, wherein:
   (a) said processing means has a plurality of signal processing sections that perform different processes, and
   (b) said second storage means has line memories corresponding to said plurality of signal processing sections.

8. A signal processor as in claim 1, wherein said first storage means has a plurality of zones used to separate-store pixel data of different broadcasting systems.

9. A signal processor comprising:
   (a) storage means for storing plural items of pixel data,
   (b) control means for writing the pixel data obtained by sampling an input signal including at least one video signal into said storage means, a write location of said storage means being determined in accordance with a location signal, and
   (c) processing means for processing said pixel data read from said storage means at an operating frequency higher than a sampling rate of said input signal.

10. A signal processor as in claim 9, wherein said control means has an address generation circuit that generates said location signal indicative of a write address of said storage means.

11. A signal processor as in claim 9, wherein said control means has functions of:
   (a) detecting a synchronizing signal in said input signal, and
   (b) increasing said storage means' write location by an integer in order that pixel data for at least one scanning line is sequentially written in said storage means as long as said synchronizing signal is not detected, or setting said write location if said synchronizing signal is detected, and activating said processing means.

12. A signal processor as in claim 9, further including, a clock generator for generating an operating clock signal of said processing means from said input signal in order that said processing means can perform read and processing operations of said pixel data in synchronism with said input signal at an operating frequency that is an integral multiple of said sampling rate.

13. A signal processor as in claim 9, wherein said storage means has a plurality of zones used to separate-store pixel data of different broadcasting systems.

14. A signal processor comprising:
   (a) storage means for storing plural items of pixel data,
   (b) processing means for processing the pixel data obtained by sampling an input signal including at least one video signal and writing such processed pixel data in said storage means, at an operating frequency higher than a sampling rate of said input signal, and
   (c) control means for reading pixel data from said storage means, a read location of said storage means being determined in accordance with a location signal.

15. A signal processor as in claim 14, wherein said control means has an address generation circuit that generates said location signal indicative of a read address of said storage means.

16. A signal processor as in claim 14, wherein said control means has functions of:
   (a) detecting a synchronizing signal in said input signal, and
   (b) increasing said storage means' read location by an integer in order that pixel data for at least one scanning line is sequentially read out of said storage means as long as said synchronizing signal is not detected, or setting said read location if said synchronizing signal is detected.

17. A signal processor as in claim 14, further including, a clock generator for generating an operating clock signal of said processing means from said input signal in order that said processing means can perform processing and write operations of said pixel data in synchronism with said input signal at an operating frequency that is an integral multiple of said sampling rate.

* * * * *